June 28, 1966  S. C. SABO ETAL  3,258,383
TIRE BUILDING APPARATUS
Filed June 4, 1963  13 Sheets-Sheet 1

INVENTORS
STEPHEN C. SABO,
JOHN L. REHMAN,
EARL D. MILLER, JR.
By Teare, Fetzer & Teare
ATTORNEYS

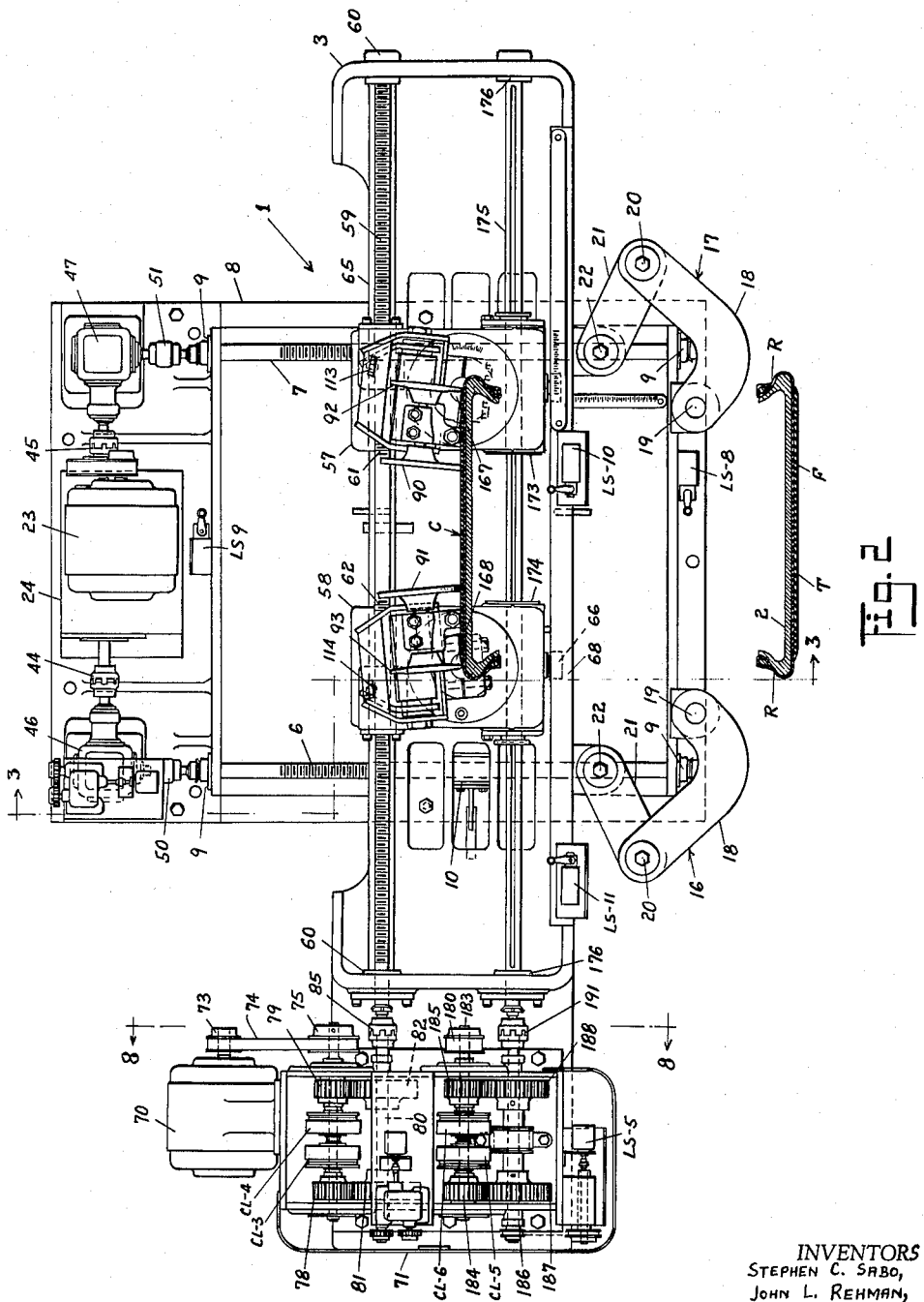

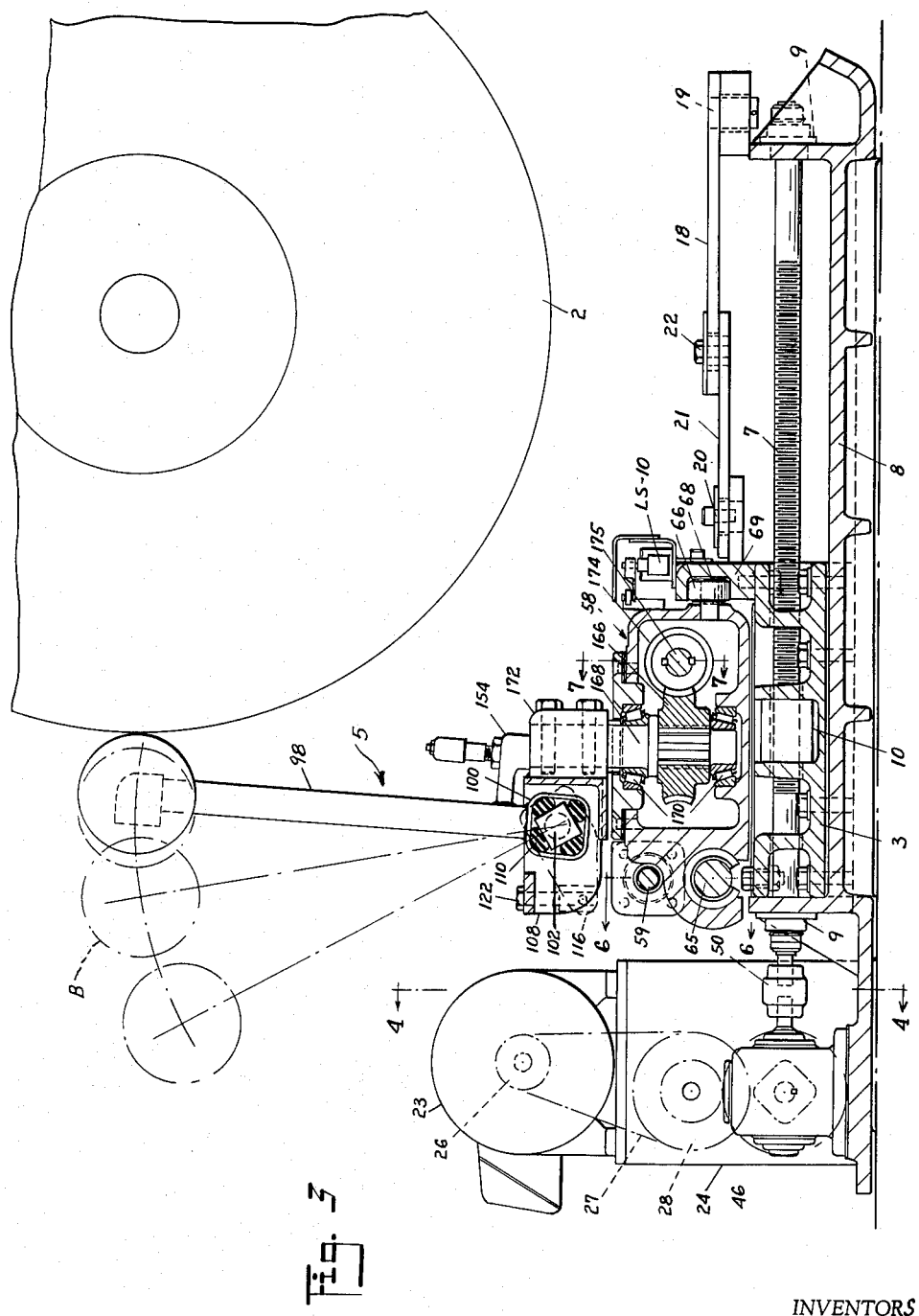

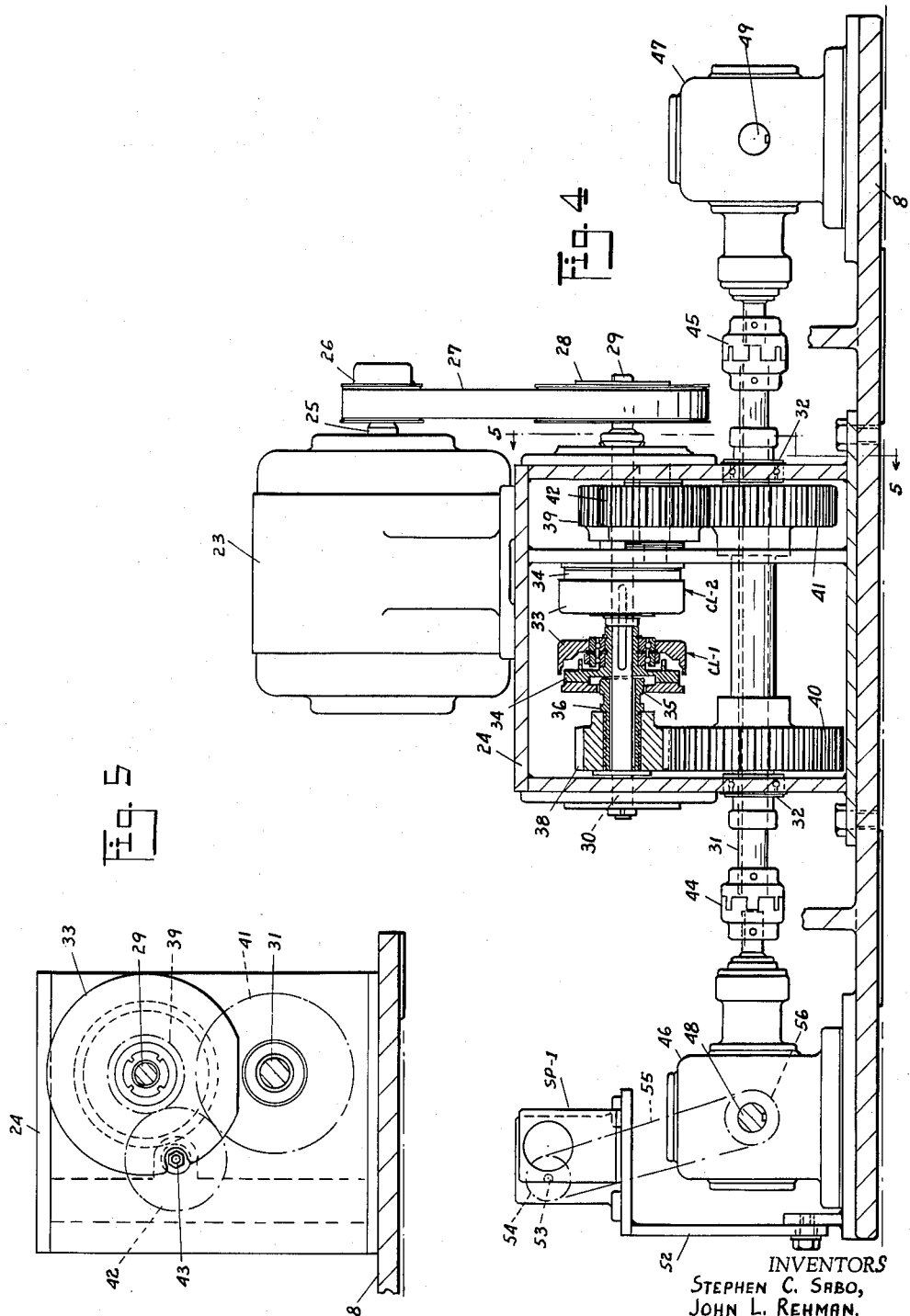

INVENTORS
STEPHEN C. SABO,
JOHN L. REHMAN,
BY  EARL D. MILLER, JR.

Teare, Tetzer & Teare
ATTORNEYS

June 28, 1966   S. C. SABO ETAL   3,258,383
TIRE BUILDING APPARATUS
Filed June 4, 1963   13 Sheets-Sheet 8

INVENTORS
STEPHEN C. SABO,
JOHN L. REHMAN,
EARL D. MILLER, JR.
BY Teare, Tetzer & Teare
ATTORNEYS June 28, 1966 S. C. SABO ETAL 3,258,383
TIRE BUILDING APPARATUS
Filed June 4, 1963 13 Sheets-Sheet 9

INVENTORS
STEPHEN C. SABO,
JOHN L. REHMAN,
BY EARL D. MILLER, JR.

Teare, Fetzer & Teare
ATTORNEYS

June 28, 1966

S. C. SABO ETAL 3,258,383

TIRE BUILDING APPARATUS

Filed June 4, 1963

INVENTORS
STEPHEN C. SABO,
JOHN L. REHMAN,
EARL D. MILLER, JR.

BY Teare, Fetzer & Teare
ATTORNEYS

INVENTORS
STEPHEN C. SABO,
JOHN L. REHMAN,
EARL D. MILLER, JR.
BY Teare, Fetzer & Teare
ATTORNEYS June 28, 1966   S. C. SABO ETAL   3,258,383
TIRE BUILDING APPARATUS
Filed June 4, 1963   13 Sheets-Sheet 13
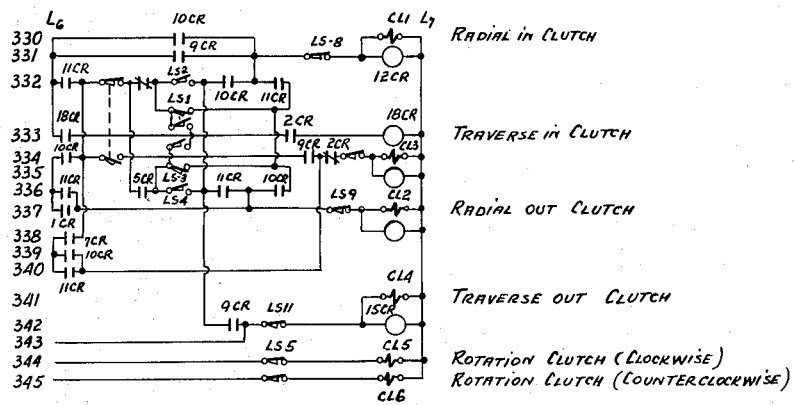
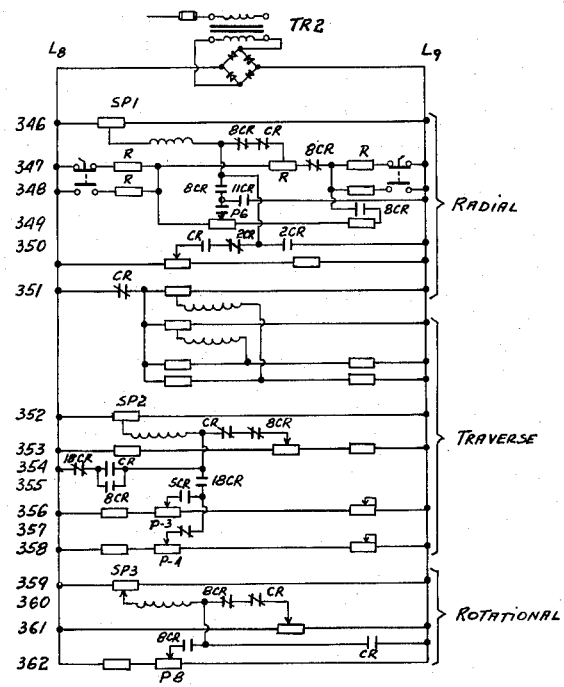
INVENTORS
STEPHEN C. SABO,
JOHN L. REHMAN,
BY  EARL D. MILLER, JR.
Teare, Fetzer & Teare
ATTORNEYS

United States Patent Office 3,258,383
Patented June 28, 1966

3,258,383
TIRE BUILDING APPARATUS
Stephen C. Sabo and John L. Rehman, Barberton, and Earl D. Miller, Jr., Cuyahoga Falls, Ohio, assignors to The Akron Standard Mold Company, Akron, Ohio, a corporation of Ohio
Filed June 4, 1963, Ser. No. 285,313
10 Claims. (Cl. 156—410)

This invention relates to an apparatus for building vehicle tires and more particularly to an improved stitcher mechanism for building large or heavy duty tires, such as those for use for trucks, buses, airplanes or the like.

Conventionally, tire bands are fabricated by applying a plurality of rubberized fabric plies to a rotating tire building drum. Two or more inextensible bead rings are then applied over the fabric plies adjacent the ends of the drum and the marginal edges of the plies turned around the bead rings and stitched into place. The tire tread is then applied to the drum and stitched into place against the plies to complete the tire band, which may then be removed from the drum and vulcanized in a conventional manner to provide a vehicle tire.

Heretofore, the building of large or heavy duty tires, such as those for buses, trucks, airplanes or the like, which incorporate a substantial number of fabric plies has been tedious, costly and time consuming because of the imprecise, inefficient, multi-part equipment, heretofore, utilized in compacting the fabric plies, and/or tread supported on the tire building drum. Such equipment has been particularly unsatisfactory with respect to the incorporation of the inextensible bead rings, which secure the marginal edges of the fabric plies together and which retain the tire on the vehicle rim, because of the difficulty in maintaining a smooth uniform pressure distribution on the plies as they are stitched into place around the bead rings. Any sleaziness or looseness in the plies relative to the bead rings causes misalignment of the rings during subsequent vulcanization of the tire bands, which results in "separation" and "blows" in the finished tire. Furthermore, non-uniform compacting of the fabric plies and/or tread produces wrinkles and air entrapment in the tire band which causes weakening of the rubberized fiber construction, thereby resulting in premature tire failure. Hence, not only cost and efficiency but dimensional stability are important factors in successful tire band construction.

Therefore, a principal object of the present invention is to provide an improved ply stitch mechanism for use with tire building apparatus, which has greater flexibility of operation, which reduces labor, which reduces tire building time, and which requires minimum space requirements in operation.

Another object of the present invention is to provide an improved ply stitch mechanism for tire building apparatus wherein a single operator with a minimum skill, working independently, may quickly and efficiently build tire bands having uniform structural characteristics.

A further object of the present invention is to provide an improved ply stitch mechanism, of the aforementioned type, for use with a tire building drum, which includes a pair of stitcher heads, each having a pair combination stitcher and turn-up wheels for smoothly and uniformly compacting fabric plies and/or tread supported on the drum.

Another object of the present invention is to provide an improved stitcher mechanism, of the aforementioned type, for use with a tire building drum, which includes resilient means for yieldably maintaining the combination stitcher and turn-up wheels in uniform pressure engagement with the drum, and means for automatically maintaining a predetermined pressure loading on the ply and tread stitch wheels during compacting of the fabric plies and/or tread supported on the drum.

A further object of the present invention is to provide an improved ply stitch mechanism, of the aforementioned type, for use with a tire building drum, which includes means for imparting selective radial, axial, and rotational movement or any combination of such movements of the stitcher heads relative to the drum, and means for automatically controlling such movement and/or movements, for smoothly and uniformly compacting the fabric plies and/or tread supported on the drum.

A still further object of the present invention is to provide an improved ply stitch mechanism, of the aforementioned type, for use with a tire building drum upon which fabric plies and/or tread of a tire band having inextensible bead rings are assembled, which includes, in combination, manual control means for automatically imparting independent, radial, axial and rotational movement or any combination of such movement to the stitcher heads relative to the drum for turning the marginal edges of the fabric plies around the head rings and for facilitating removal of the tire band from the drum upon completion of the tire building operation.

Other objects and advantages of the present invention will be apparent from the following description taken in conjunction with the accompanying drawings, wherein:

FIG. 2 is a top plan view, with parts in section of the novel stitcher mechanism of FIG. 1;

FIG. 3 is an enlarged cross-sectional view taken along the plane of line 3—3 of FIG. 2, with a fragmentary portion of the tire building drum shown in solid line;

FIG. 4 is an enlarged cross-sectional view taken along the plane of line 4—4 of FIG. 3, showing the motive means for moving the radial carriage mounting the respective stitcher heads radially toward and away from the drum;

FIG. 5 is a cross-sectional view taken along the plane of line 5—5 of FIG. 4;

FIG. 10 is an enlarged top plan view, showing the support assembly of one of the stitcher heads with the stitcher arm removed therefrom for purposes of clarity;

FIGS. 19 through 21, inclusive, are schematic illustrations of a preferred electrical control system for operating the novel stitcher mechanism of the present invention.

GENERAL ARRANGEMENT

Figure 1:
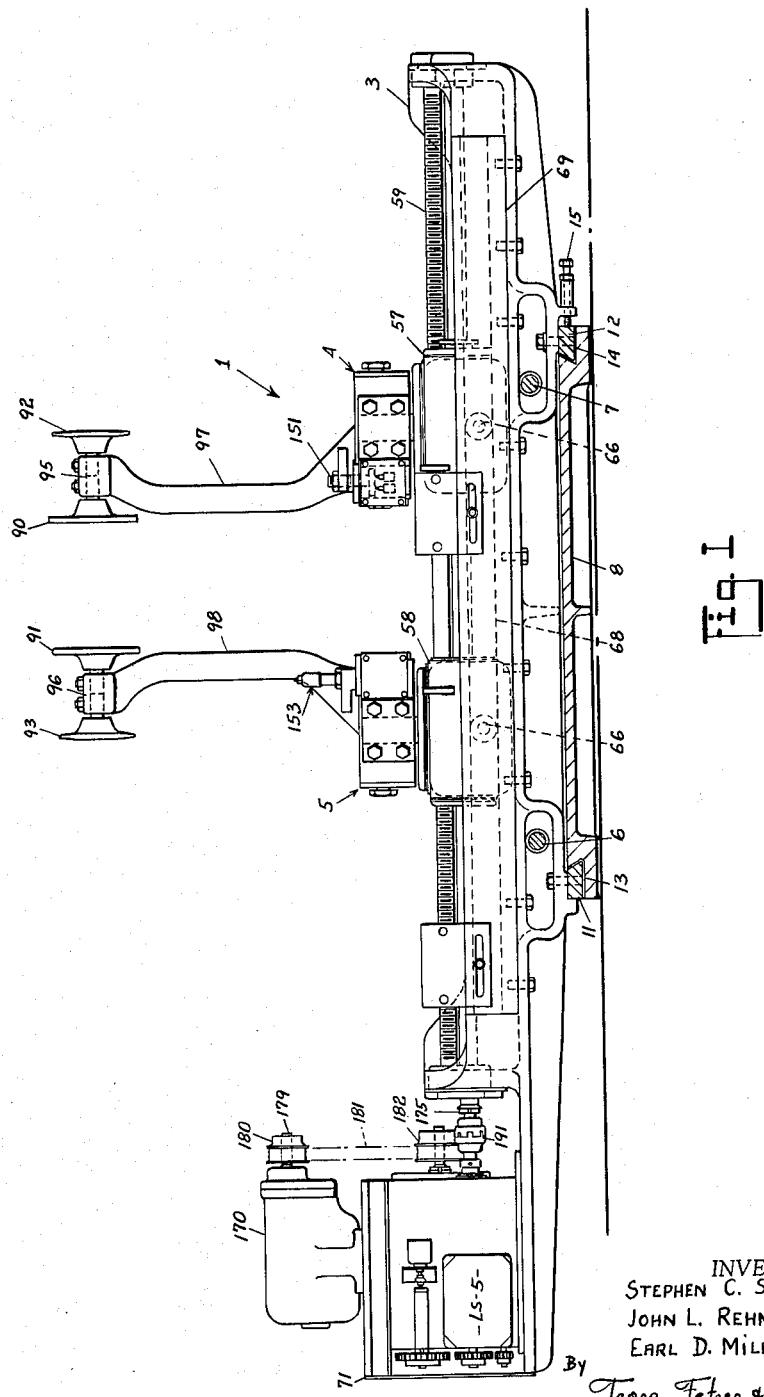
FIG. 1 is an elevational view, with parts removed, of the novel stitcher mechanism of the present invention.

Referring to FIGS. 1 to 3 of the drawings, the present invention, broadly described, comprises a stitcher assembly designated generally at 1, which may be conveniently disposed adjacent a rotatable drum 2 of a conventional tire building machine (not shown). The stitcher assembly 1 includes a pair of oppositely disposed stitcher heads 4 and 5 supported for simultaneous and synchronous axial movement, toward and away from one another on a pair of stitcher traverse carriages 57 and 58, respectively. The axially movable stitcher traverse carriages 57 and 58 are mounted on a radial carriage 3 which is preferably supported on a base or frame 8 for moving the respective stitcher heads 4 and 5 radially inwardly and outwardly relative to the drum 2. The stitcher heads 4 and 5 each include a pair of combination stitcher 90, 91 and turn-up 92, 93 wheels supported for rotation toward and away from the drum, in a generally horizontal plane, on the aforementioned stitcher traverse carriages 57 and 58. The respective stitcher heads 4 and 5 are provided with resilient means 109 and 110 operably coacting therewith, for yieldably maintaining the combination stitcher and turn-up wheels, with a predetermined loading pressure, against the drum 2 during the ply and tread stitch cycle of operation.

Generally, in operation of the stitcher assembly 1, a plurality of fabric plies F comprising the tire band may be sequentially applied to the rotating drum 2 from a conventional ply servicer (not shown). The radial carriage 3, which mounts the respective stitcher heads 4 and 5, may be moved radially inwardly toward the drum 2 until the respective stitcher wheels 90, 91 are loaded with a predetermined radial pressure against the fabric plies F. The traverse carriages 57 and 58 are then automatically and simultaneously moved axially apart, such that the resiliently mounted stitcher wheels are caused to yieldably stitch outwardly along the fabric plies F toward the ends of the drum 2. The marginal edges of the fabric plies F may then be stitched-down by manually, and/or automatically rotating the turn-up wheels 92, 93 simultaneously around the shoulders of the drum 2, utilizing the drum 2 as a template in the manner of a profiling operation. The bead rings R may then be positioned on the fabric plies F adjacent the ends of the drum from a conventional bead servicer (not shown) whereupon the marginal edges of the plies are turned up around the bead rings R by manual and/or automatic rotation of the turn-up wheels 92, 93, as aforesaid. The stitcher heads 4 and 5 may then be returned to the start position to commence the tread stitching cycle of operation.

The tire tread T may then be applied to the rotating drum 2 from a conventional tread servicer (not shown) and the radial carriage again moved toward the drum 2 until the stitcher wheels 90, 91 are again loaded, with a predetermined radial pressure, against the tire tread T. The stitcher traverse carriages 57 and 58 are automatically and simultaneously moved axially apart such that the resiliently mounted stitcher wheels 90, 91 are caused to yieldably stitch-out along the tire tread T toward the ends of the drum, thereby providing the completed tire band C. The ply band C may then be detached from the drum 2 by inserting the turn-up wheels 92, 93 between the ply band C and the drum 2, and by then moving the wheels radially away from the drum 2, thereby effectively breaking the adhesive bond of the ply band C to the drum. The drum 2 may then be collapsed and the ply band C removed therefrom in the usual manner for subsequent vulcanization.

CARRIAGE ASSEMBLY

Referring now more particularly to FIGS. 1 to 5 of the drawings, the radial carriage 3, for moving the stitcher heads 4 and 5 towards and away from the tire building drum 2, is shown mounted on a pair of oppositely disposed twin screws 6 and 7 rotatably journaled at their opposite ends upon the base 8 by ball bearing bushings 9. The driving connection between the twin screws 6 and 7 and the carriage 3 includes a pair of threaded nuts 10 fixedly secured to the carriage 3 and threadably coacting therewith, such that rotation of the latter in one direction functions to move the carriage 3 radially inwardly toward the drum 2, while rotation in the opposite direction functions to move it radially away from the drum.

To guide and steady the carriage 3 during radial movement thereof, a pair of elongated gibs or cams 11 and 12 affixed to the carriage are disposed to be slidably received within complementary elongated key-way slots 13 and 14 provided adjacent opposing marginal edges of the base frame 8. An adjustable screw 15 may be threadably mounted adjacent one side of the carriage 3 for bearing engagement against one of the gibs 12, for adjusting the gib.

In the form illustrated, the carriage 3 may further be provided with a pair of oppositely disposed movable yoke assemblies 16 and 17, which act as protective covers for the twin screws 6 and 7, as best shown in FIG. 2. Preferably, each yoke assembly includes a generally L-shaped lever arm 18 pivotally secured at one end 19 to the base 8, and pivotally secured at its other end 20 to one end of a link member 21. The link member 21 may in turn be pivotally secured at its other end 22 to the carriage 3. By such an arrangement, radial movement of the carriage 3 away from the drum 2 results in a linear alignment of the yoke assemblies 16 and 17 in a juxtaposed relation over the otherwise exposed twin screws, thereby providing a protective shield during use of the stitcher assembly.

Rotational movement may be imparted to the twin screws 6 and 7 from an electric motor 23, which is preferably affixed to a gear housing 24 mounted rearwardly on the base 8. The output shaft 25 of the motor 23 is provided with a stepped drive pulley 26 which mounts a drive belt 27. The drive belt 27 is trained over a driven pulley 28 fixedly secured to one end of a drive shaft 29 which is journaled at its opposite ends in the gear housing 24, as by ball bushings 30. The drive shaft 29 serves to support a pair of spaced apart, electrically responsive clutches CL1 and CL2 (FIG. 4) for selectively engaging and disengaging the driving connection to a second drive shaft 31, which is journaled at its opposite ends, as by ball bushings 32, in the gear housing 24.

The respective clutches CL1 and CL2 are preferably of identical construction, each of which comprises an electro-magnetic driving hub 33 fixedly secured for rotation on the shaft 29 and frictionally engageable with an oppositely disposed magnetic driven disk 34, as best shown in FIG. 4. The magnetic disks 34 of the respective clutches CL1 and CL2 are keyed for relative axial movement, as at 35, adjacent the ends of a pair of cylindrical bearing sleeves 36 and 37 for frictional driving engagement with the electro-magnetic hubs 33 upon energization of the respective clutches. The cylindrical bearing sleeves 36 and 37 are supported for free rotation on the drive shaft 29 and mount a pair of oppositely disposed idler gears 38 and 39 which are fixedly secured thereto. Moreover, upon energization of the clutch CL1 and deenergization of clutch CL2, the magnetic disk 34 is moved axially from its keyed connection on the bearing sleeve 36, thereby enabling the idler gear 38 to freely rotate relative to the drive shaft 29. Conversely, the energization of clutch CL2 and deenergization of clutch CL1 moves the other magnetic disk 34 from its keyed connection on the bearing sleeve 37, thereby enabling the other idler gear 39 to freely rotate relative to the shaft 29.

In the form illustrated, the driving connection from the drive shaft 29 to the drive shaft 31 is achieved by a pair of oppositely disposed driven gears 40 and 41 fixedly secured to shaft 31, one of which is engageable with the idler gear 38 for rotating the shaft 31 in one direction upon energization of clutch CL1, and the deenergization of clutch CL2. The other driven gear 41 is engageable with a spur gear 42 (FIG. 5) which is rotatably mounted on a stub shaft 43 journaled into the gearing housing. The spur gear 42 is in turn engageable with the other idler gear 39 for rotating the drive shaft 31 in the opposite direction upon energization of clutch CL2 and the deenergization of CL1.

To provide for connection between the drive shaft 31 and the respective twin screws 6 and 7, the drive shaft 31 is operably connected at its opposite ends by means of flexible couplings 44 and 45 to a pair of oppositely disposed speed reducers 46 and 47. The output shafts 48 and 49 of the respective speed reducers 46 and 47 are in turn operably connected to the twin screws 6 and 7 by means of a second pair of flexible couplings 50 and 51, as best shown in FIGS. 2 and 3.

A slave or reference potentiometer SP-1 (FIG. 4) is mounted adjacent the first mentioned speed reducer 46 on a support bracket 52 which is fixedly secured to the base 8. The input shaft 53 to the potentiometer SP-1 is provided with a driven pulley 54 which mounts the timer belt 55 that in turn is trained over a drive pulley 56, which is fixedly secured to the output shaft 48 of the speed reducer 46. Moreover, rotational movement imparted to the respective twin screws 6 and 7 is mechanically directed to the reference potentiometer SP-1, which functions to actuate clutches CL1 and CL2 for controlling movement of the carriage 3 radially toward and away from the drum, as will hereinafter be more fully described with reference to the cycle of operation.

Figure 6:
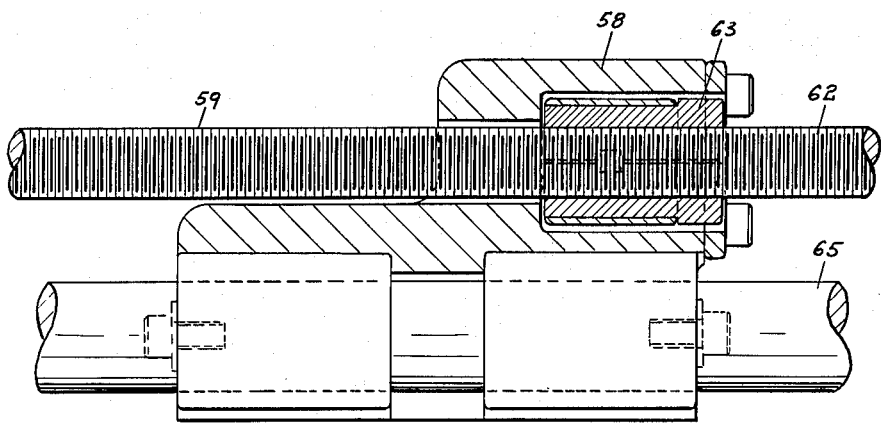
FIG. 6 is an enlarged fragmentary sectional view taken along the plane of line 6—6 of FIG. 3, showing the threaded engagement with one of the traverse carriages for driving one of the stitcher heads axially toward and away from the other stitcher head.
Figure 7:
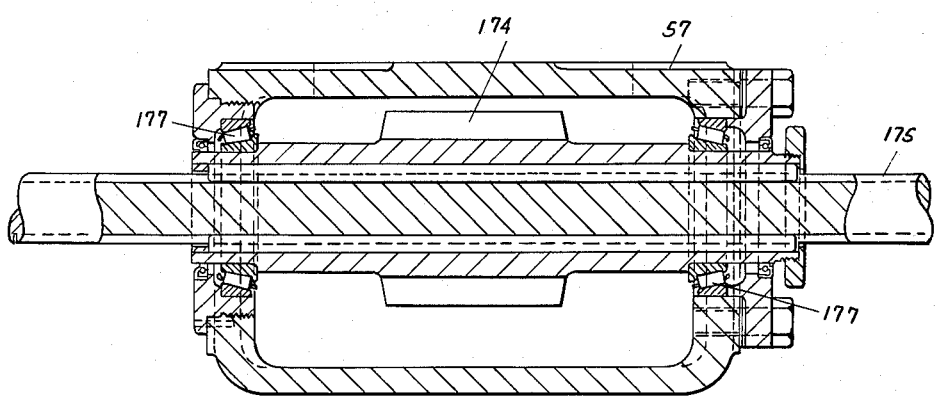
FIG. 7 is an enlarged fragmentary sectional view taken along the plane of line 7—7 of FIG. 3, showing the worm gear construction in one of the traverse carriages for rotating one of the stitcher heads in a generally horizontal plane toward and away from the drum.

As best shown in FIGS. 1 to 3 and 6 of the drawings, the traverse carriages 57 and 58, which support the respective stitcher heads 4 and 5, are mounted on the radial carriage 3 for axial movement toward and away from one another by means of a drive screw 59 which is journaled at its opposite ends into the radial carriage 3 by means of ball bushings 60. The drive screw 59 is oppositely threaded, as at 61 and 62, for threaded engagement into nuts 63 provided in each of the respective traverse carriages 57 to 58, as best shown in FIGS. 2 and 6. Rotation of the drive screw 59 in one direction, therefore, functions to move the traverse carriages 57 and 58 axially toward each other, while rotation of the screw 59 in the opposite direction functions to move them axially apart.

To guide and steady the respective traverse carriages 57 and 58 during axial movement thereof, the carriages may be slidably supported at one end on a horizontally extending guide shaft 65 which is fixedly secured adjacent its opposite ends into the radial carriage 3. The respective traverse carriages 57 and 58 are supported for axial movement at their other end by means of cylindrical cam followers 66 which are arranged for camming co-action within an elongated cam track 68 (FIG. 3) that is provided in a guide bracket 69 fixedly secured to the radial carriage 3.

Figure 8:
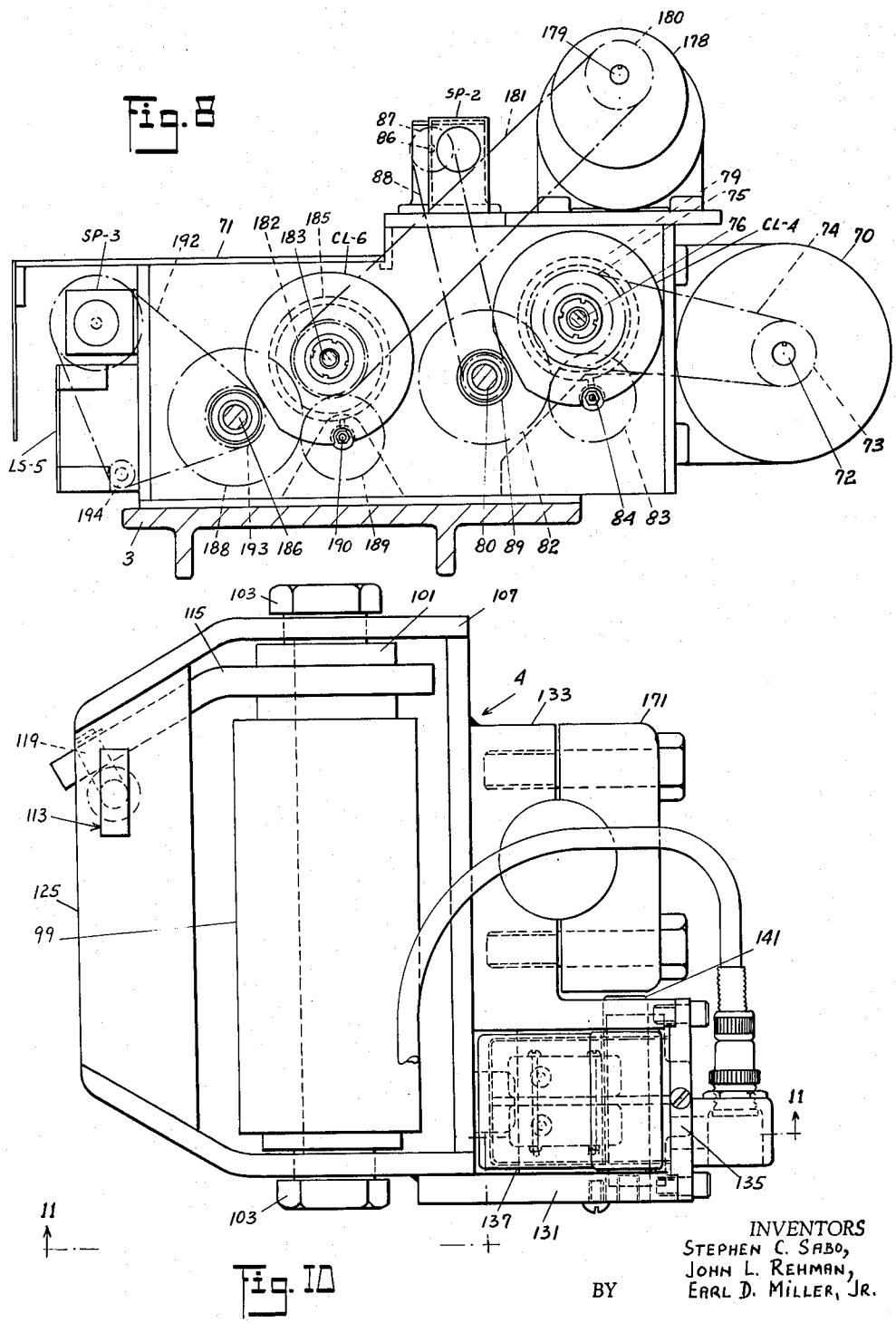
FIG. 8 is an enlarged cross-sectional view taken along the plane of line 8—8 of FIG. 2, showing the motive means for moving the respective stitcher traverse carriages axially toward and away from one another and for rotating the respective stitcher heads mounted thereon toward and away from the drum.
Figure 9:
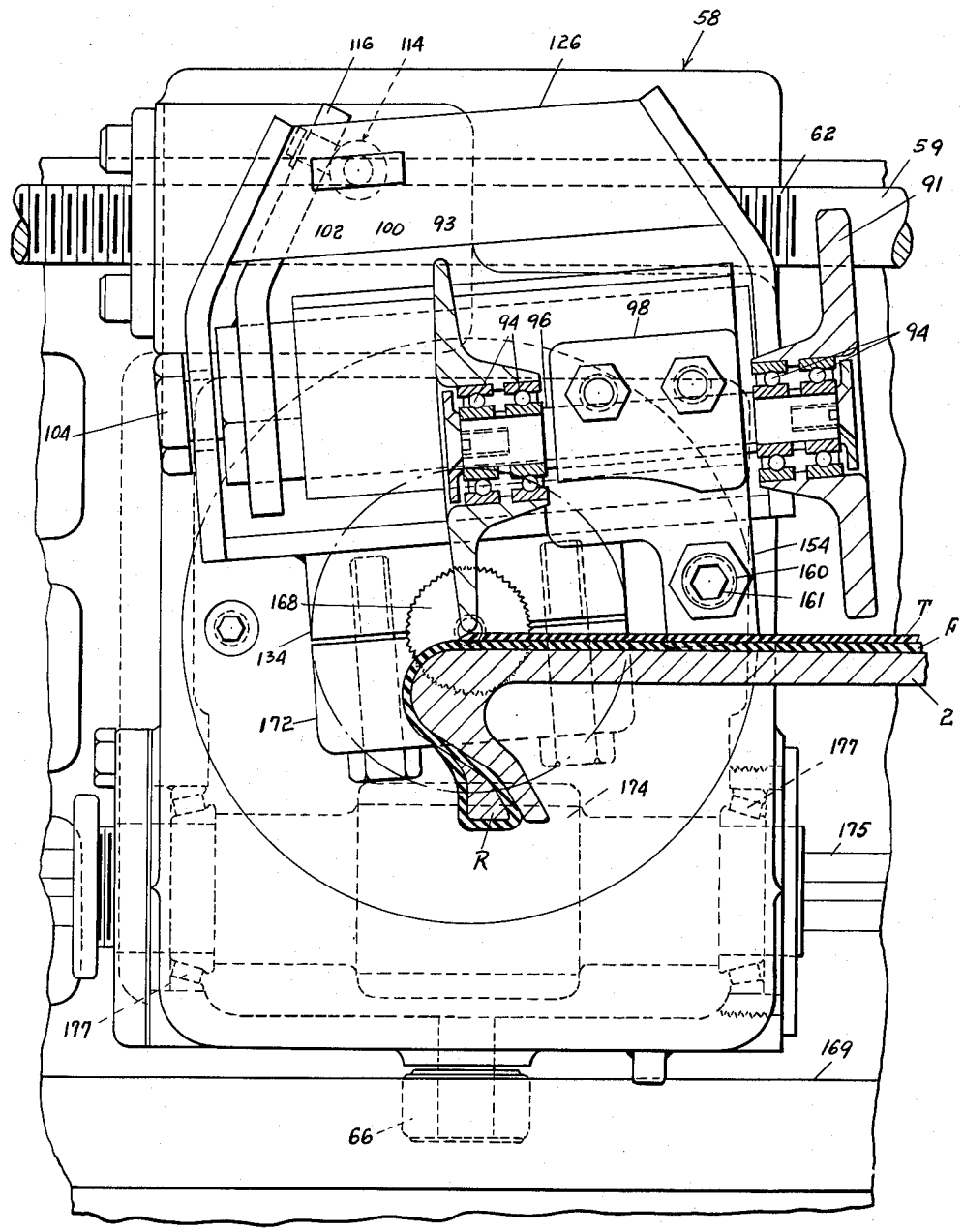
FIG. 9 is an enlarged fragmentary view showing in greater detail the stitcher head of FIG. 2.

Rotational movement may be imparted to the drive screw 59 from another electrical motor 70, which is preferably mounted on a second gear housing 71, that in turn is supported at one end of the carriage 3, as best viewed in FIGS. 2 and 8. The output shaft 72 of the motor 70 is provided with a drive pulley 73 which mounts a drive belt 74. The drive belt 74 is trained over a driven pulley 75 fixedly secured to one end of a drive shaft 76. As shown, the drive shaft 76 is journaled at its opposite ends in the gear housing 71.

As in the case of the aforementioned radial carriage assembly, the drive shaft 76 supports a pair of spaced apart, electrically responsive clutches CL3 and CL4 and a pair of idler gears 78 and 79 spaced on either side of the clutches for selectively engaging and disengaging the driving connection to a second drive shaft 80, as best shown in FIGS. 2 and 8. The drive shaft 80 is journaled adjacent its opposite ends into the gear housing 71 and fixedly supports a pair of driven gears 81 and 82 thereon. The driven gear 81 is supported for engagement with one of the idler gears 78 for rotating the drive screw 59 in one direction, thereby moving the stitcher heads 4 and 5 axially towards one another upon energization of clutch CL3. The other driven gear 82 is engageable with a spur gear 83 (FIG. 8) which is rotatably mounted on a stub shaft 84 journaled in the gear housing 71. The spur gear 84 is engageable with the other idler gear 79 for rotating the drive screw 59 in the opposite direction, thereby moving the stitcher heads 4 and 5 axially apart upon the energization of the clutch CL4 and the deenergization of clutch CL3. The output end of the drive shaft 76 is detachably connected to the input end of the drive screw 59 by means of a flexible coupling 85, as best shown in FIG. 2.

In the form illustrated, another slave or reference potentiometer SP-2 (FIG. 8) may be fixedly secured to the gear housing 71, the input shaft 86 of which is provided with a driven pulley 87 that mounts a timer belt 88. The timer belt 88 is trained over a driven pulley 89 fixedly secured to the drive shaft 80. Moreover, rotational movement of the drive shaft 80 and the drive screw 59 coupled thereto, is mechanically directed to the potentiometer SP-2 which functions to actuate clutches CL3 and CL4 for automatically controlling axial movement of the respective stitcher heads 4 and 5 toward and away from each other, as will hereinafter be more fully described with reference to the cycle of operation.

STITCHER HEAD ASSEMBLY

As best shown in FIGS. 1 to 3 and 9 of the drawings, the respective stitcher heads 4 and 5 each preferably include a pair of oppositely disposed, axially aligned, combination stitcher 90, 91 and turn-up wheels 92, 93 rotatably mounted by ball bushings 94 adjacent the outer ends of a pair of horizontally extending stub shafts 95 and 96. The shafts 95 and 96 are preferably secured to the ends of a pair of oppositely disposed generally C-shaped stitcher arms 97 and 98. The face or outer peripheral surface of the respective turn-up wheels 92, 93 is preferably of a narrow arcuate or rounded configuration (in vertical cross-section) with the diameter of the wheels being slightly less, as compared to that of the stitcher wheels 90, 91 to perform the ply stitch down and turn-up operations and to facilitate removal of the tire band upon completion of the tire building cycle. The face or outer peripheral surface of the larger stitcher wheels 90, 91 is preferably flat or planar (in vertical cross-section) to perform the ply stitch, tread stitch, side wall stitch and similar operations as required, during the tire building operation.

The provision of a relative size difference between the diameters of the respective stitcher 90, 91 and turn-up 92, 93 wheels enables the larger stitcher wheels to independently contact the fabric plies and/or tread supported on the drum, thereby to perform the desired stitching operations without interference from the oppositely disposed turn-up wheels. Conversely, such relative size difference enables the turn-up wheels 92, 93 to perform the desired ply turn-down and turn-up operations without interference from the larger stitcher wheels 90, 91 upon rotation of the respective stitcher heads 4 and 5 in a generally horizontal plane for stitching around the shoulders of the drum.

Accordingly, such unitary stitcher and turn-up wheel construction enables the necessary ply and tread stitching to be accomplished in a single operation, thereby eliminating the requirement of multi-part apparatus and/ or operations, as has heretofore been customary with conventional tire building equipment.

To provide for pivotal engagement of the stitcher heads 4 and 5 against the drum, the ends of the respective stitcher arms 97 and 98 may be provided with integral, hollow, generally square-shaped hubs 99 and 100, which are resiliently mounted on a pair of generally square-shaped inner shafts 101 and 102, as best shown in FIGS. 3 and 10 to 15. The inner shafts 101 and 102 are disposed horizontally within the hubs 99 and 100 and are provided at their opposite ends with axle bolts 103 and 104 journaled in the side walls of a pair of stitcher arm brackets 107 and 108 which in turn are supported for rotation on the respective traverse carriages 57 and 58.

Figure 11:
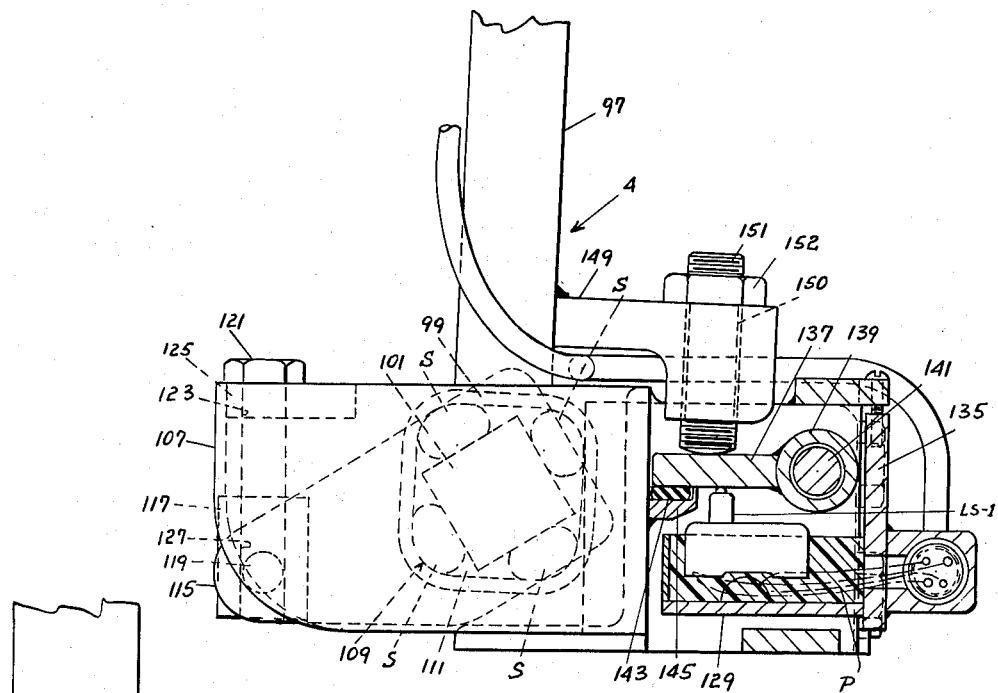
FIG. 11 is a fragmentary cross-sectional view taken along the plane of line 11—11 of FIG. 10, showing the stitcher arm tilted (broken lines) when in operative engagement with the drum and in a normally inoperative (solid line) position away from the drums.
Figure 14:
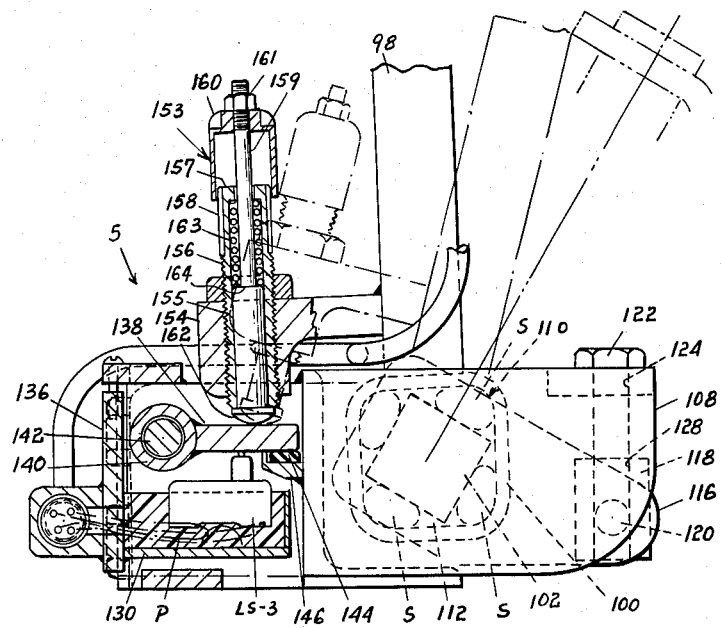
FIG. 14 is a fragmentary cross sectional view taken along the plane of line 14—14 of FIG. 13, showing the stitcher arm tilted (broken line) when in an operative engagement with the drum and in a normally inoperative (solid line) position away from the drum.

Resilient mounting of the stitcher arms 97 and 98, for maintaining the stitcher wheels 90-93 journaled thereon in predetermined radial pressure compacting engagement against the drum, is accomplished by means of a pair of torsion springs, designating generally at 109 and 110 disposed between the inner shafts 101, 102 and the respective hubs 99, 100. As shown in FIGS. 3, 11 and 14, each torsion spring preferably includes four, generally elongated, rope-like strands S comprised of elastomeric material, such as rubber, synthetic rubber or the like. Each strand S is disposed to extend through the generally triangular clearance areas 111 and 112 defined between the outer surface of the inner shafts 101, 102 and the inner surface of the hubs 99, 100 when the latter are rotated about 45° relative to the respective shafts.

In the form illustrated, and prior to assembly, the individual rope-like strands S are preferably circular in cross-section and of a dimension sufficient to provide the desired torsional characteristics for maintaining the stitcher heads 4 and 5 in working engagement against the drum. Upon assembly, the triangular clearance areas 111 and 112 (FIGS. 11 and 14) defined between the inner shafts and as aforesaid, function to deform the strands S, which causes the strand material to spread into the interior corners of the surrounding hubs 99 and 100, thereby providing a resilient pivotal support of the respective stitcher arms 97 and 98 mounted thereon. For purposes of disclosure, though the respective inner shafts and surrounding hubs have been illustrated as generally square in cross-section, it is to be understood that other configurations may be also utilized, such as for example, triangular, octagonal, hexagonal, and other such configurations that will accommodate any number and/or arrangement of the aforementioned torsion springs, dependent upon the resilient characteristics required in a particular tire building operation.

To pre-load the stitcher heads 4 and 5 with the desired radial pressure against the drum, the stitcher arms 97 and 98 are each provided with adjustable stop means, designated generally at 113 and 114, which are preferably of identical construction. As shown in FIGS. 2, 10, 11, 13 and 14 of the drawings, the stop means each include bent arm members 115 and 116 fixedly secured at one end to the rotatable inner shafts 101, 102 and are attached at their other end to vertically adjustable block members 117 and 118 by means of stub shafts 119 and 120 which extend therefrom for locking the inner shafts 101 and 102 in a fixed position with respect to the outer hubs 99 and 100. Threaded screws 121 and 122 (FIGS. 11 and 14) are disposed to extend through bores 123 and 124 provided in cross plates 125 and 126 on the stitcher arm brackets 107 and 108. The screws 121 and 122 are adapted to be threadably received within threaded bores 127 and 128 provided in the respective block members 117 and 118, such that manual actuation of the screws, by means of a suitable tool, imparts relative vertical movement to the adjustable block members 117 and 118 for rotating and locking the inner shafts 101, 102 in a fixed position relative to the resiliently mounted outer hubs 99, 100. Accordingly, by proper adjustment of the threaded screws, 121 and 122, the torsion springs 109 and 110 may be wound or unwound by rotating the inner shafts 101 and 102 which are then locked in a stationary position, such that a predetermined radial pressure may be applied to the stitcher heads 4 and 5 for working engagement with the drum.

In another form, the torsion springs may be pre-loaded by "over-running" the stitcher heads 4 and 5, namely, by moving the stitcher heads radially inwardly to bear against the tire building drum 2, such that the stitcher arms 97 and 98 rotate in a direction away from the drum, as shown by broken lines B in FIG. 3. Rotational movement of the outer hubs 99 and 100 on the torsion springs 109 and 110 with respect to the stationary inner shafts 101 and 102 causes the torsion springs to "wind-up" in the opposite direction, such that a predetermined radial pressure may be applied to the stitcher heads upon engagement with the drum. The resilient, damping characteristics of the torsion spring material enables the stitcher heads 4 and 5 to be yieldably maintained with a uniformly constant loading pressure against the outer peripheral surface of the drum. Moreover, the stitcher wheels do not bounce or skip over the fabric plies supported on the drum, thereby eliminating "separation" and "blows" during subsequent curing of the finished tire.

To selectively and automatically control radial and/or axial movement of the respective stitcher heads, thereby maintaining a predetermined pressure loading of the stitcher heads 4 and 5 against the drum 2, the stitcher head 4 may be provided with a pair of low pressure limit switches LS1 and LS2 (FIGS. 11 and 12) for ply stitching, while the other stitcher head 5 may be provided with a pair of high pressure limit switches LS3 and LS4 (FIGS. 14 and 15) for tread stitching. As shown in FIGS. 11 and 14 of the drawings, the respective switches LS1–LS4 are preferably embedded in a polymeric insulating material P, such as an epoxy resin or the like, which enables the respective switches to be insulated from and precisely positioned within a pair of removable supporting trays 129 and 130. The supporting trays are mounted between retaining flanges 131, 132 and generally L-shaped bracket plates 133, 134 which extend from the respective stitcher support brackets 107 and 108. The supporting trays are provided at one end with integral upstanding face plates 135 and 136 which are detachably connected to the marginal ends of the respective retaining flanges 131, 132 and bracket plates 133, 134, such that the supporting trays and switches mounted therein can be quickly assembled or disassembled from the stitcher mechanism as a unit.

The respective limit switches LS1–LS4 (FIGS. 11 and 14) are actuated by means of rotatable contact plates 137 and 138, each of which is provided at one end with an integral cylindrical bearing sleeve 139 and 140. The bearing sleeves 139 and 140 are rotatably mounted on horizontally extending shafts 141 and 142 which are fixedly secured at their opposite ends between the respective retaining flanges 131, 132 and bracket plates 133, 134. The free ends of the respective contact plates 137 and 138 are adapted for engagement with bumper pads 143 and 144, comprised of a resilient material, such as rubber or the like. The respective pads are mounted on generally L-shaped retainer plates 145 and 146 that extend from the respective sticher support brackets 107 and 108 and function as abutment means for limiting rotational movement of the respective contact plates 137 and 138.

Figure 12:
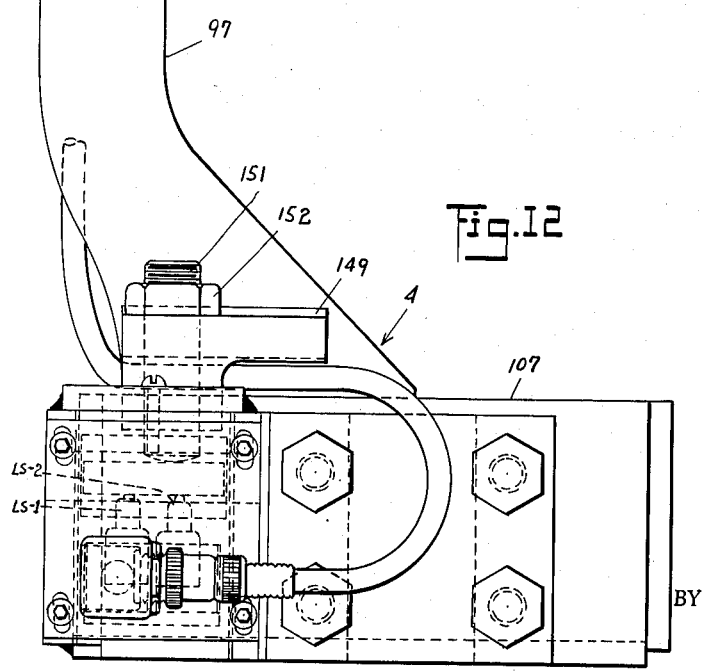
FIG. 12 is a fragmentary side elevational view taken from the right hand side of FIG. 11.

As shown in FIGS. 10 to 12 of the drawings, the stitcher arm 97 of the stitcher head 4 is provided adjacent one end with an outwardly extending bracket arm 149 which has a threaded bore 150 extending therethrough for threadably receiving an adjustment screw 151 therein. The adjustment screw 151 is adapted to bear at one end against the rotatable contact plate 137 and is provided at its other end with a suitable retainer 152, such as a lock nut or the like, for enabling vertical adjustment of the screw. In a normally inoperative position, as shown in FIG. 11 of the drawings, the stitcher arm 97 is in a generally vertical position and out of engagement with the drum, such that the adjustment screw 151 is positioned to bias the contact plate 137 downwardly against the bumper pad 143, for actuating the respective limit switches LS1 and LS2. Upon engagement with the drum, the stitcher arm 97 is rotated radially away from the drum 2, which causes the adjustment screw 151 to ride off its contact plate 137. The bumper pad 143, which was originally compressed, then expands to bias the contact plate 137 upwardly thereby again actuating the respective switches LS1 and LS2.

In the form illustrated in FIG. 12, the switch LS1 is preferably positioned slightly above switch LS2, such that rotation of the contact plate 137 functions to actuate switch LS1 before actuation of switch LS2.

Accordingly, by proper adjustment of the screw 151, actuation of the respective switches may be coordinated to maintain a predetermined radial and/or axial pressure loading on the respective stitcher heads 4 and 5 during the ply stitch cycle of operation.

Figure 13:
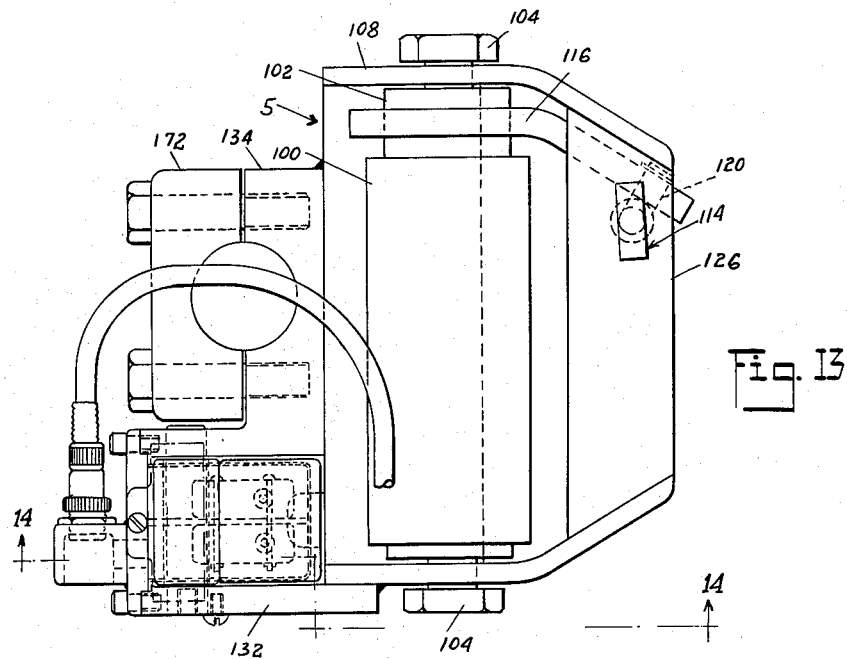
FIG. 13 is an enlarged top plan view, showing the support assembly of the other stitcher head with the stitcher arm removed therefrom for purposes of clarity.
Figure 15:
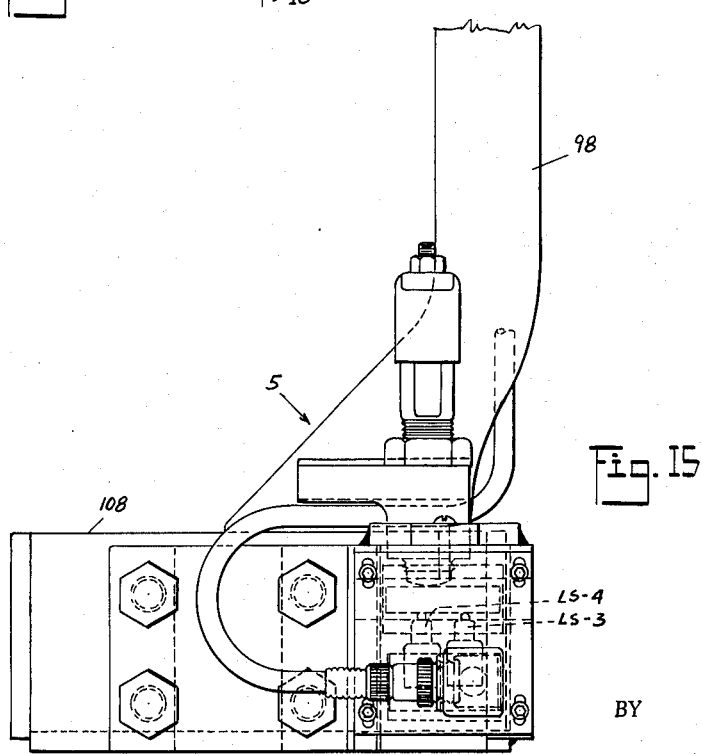
FIG. 15 is a fragmentary side elevation view taken from the left hand side of FIG. 14.

As shown in FIGS. 13 to 15 of the drawings, the stitcher arm 98 of the other stitcher head 5 is preferably provided with a compression spring assembly, designated generally at 153, for maintaining a predetermined radial and/or axial loading pressure on the respective stitcher heads 4 and 5 for tread stitching, as aforesaid. As shown in FIG. 14, the stitcher arm 98 is provided adjacent one end with an outwardly extending bracket arm 154 having a threaded bore 155 extending therethrough, to receive one end of an elongated, hollow, threaded sleeve 156 therein. The threaded sleeve 156 is provided adjacent its upper end with an apertured top portion 157 and on its exterior surface thereof with a smooth cam surface 158. An elongated stepped adjustment rod 159 is disposed for reciprocal movement within the threaded sleeve 156. The adjustment rod 159 is threaded at its upper end into a cylindrical retainer cap 160 that is mounted for telescoping sliding engagement over the smooth cam surface 158 adjacent the upper end of the sleeve. Vertical adjustment of the retainer cap 160 may be achieved by means of a suitable fastener, such as a lock nut 161 threaby mounted on the upper end of the adjustment rod 159. The lower end of the adjustment rod 159 is provided with a rounded head portion 162 which is adapted for sliding engagement on the contact plate 138. A resilient means, such as a coil spring 163, is disposed around the adjustment rod 159 bearing at one end against the apertured top portion 157 of the sleeve 156 and bearing at its other end against a shoulder portion 164 formed on the adjustment rod 159, thereby resiliently biasing the adjustment rod against its respective contact plate 138.

In operation, as the stitcher arm 98 rotates radially backwardly upon engagement with the drum, the adjustment rod 159 commences to ride off its contact plate 138. Continued movement of the stitcher arm 98 causes the coil spring 163 to expand, which forces the adjustment rod 159 downwardly, thereby maintaining engagement with the contact plate 138 for a longer period of time, as shown by broken lines in FIG. 14. Such application is desirable, as for example, during the tread stitch cycle of operation, wherein it is advantageous that a predetermined radial pressure be maintained on the respective stitch wheels 90, 91 as they stitch-out along the tread toward the opposed ends of the drum 2. Here again, as in the case of automatic control of the aforementioned stitcher head 4, the switch LS3 is positioned slightly above switch LS4 (FIG. 15) for the purposes as aforementioned. Accordingly, by proper adjustment of the compression spring assembly 153, actuation of the switches may be coordinated to maintain a predetermined radial and/or axial loading pressure on the respective stitcher heads 4 and 5 during the tread stitch cycle of operation.

As shown in FIGS. 2, 3, 7 and 9 of the drawings, rotational movement of the stitcher heads 4 and 5, in a generally horizontal plane toward and away from the drum 2, may be accomplished by means of a worm gear assembly associated with each of the respective stitcher traverse carriages 57 and 58. In the form illustrated, worm gears 165 and 166 may be fixedly secured on vertically extending bearing shafts 167 and 168 which are journaled within the stitcher traverse carriages 57 and 58 by means of oppositely disposed pairs of roller bushings 169 and 170. The upper ends of the bearing shafts 167 and 168 extend exteriorly of the traverse carriages 57 and 58 and are fixedly secured to the L-shaped bracket plates 133 and 134 of the stitcher support brackets 107 and 108 by means of detachable retainer plates 171 and 172.

A pair of cylindrical worms 173 and 174 operably engageable with the respective worm gears 165 and 166 are fixedly secured in tandem alignment on a drive shaft 175 which extends horizontally through the respective stitcher traverse carriages 57 and 58. As shown in FIG. 2 of the drawings, the drive shaft 175 is journaled adjacent its terminal ends into the radial carriage 3 by roller bushings 176. The cylindrical worms 173 and 174 in turn are journaled adjacent their opposite ends into the respective stitcher traverse carriages 57 and 58 by roller bushings 177, such that rotation of the drive shaft 175 in one direction, therefore, functions to rotate the respective stitcher heads 57 and 58 supported thereon in a generally horizontal plane in one direction, while rotation of the shaft 175 in the opposite direction functions to rotate them in the opposite direction.

As viewed in FIGS. 1, 2 and 8 of the drawings, rotational movement may be imparted to the drive shaft 175 from an electric motor 178 which is fixedly secured to the gear housing 71. The output shaft 179 and the motor 178 is provided with a drive pulley 180 which mounts a drive belt 181. The drive belt 181 is trained over a driven pulley 182 fixedly secured to one end of a drive shaft 183 which is journaled into the gear housing 71.

As in the aforementioned radial and axial carriage assemblies, the drive shaft 183 supports a pair of spaced apart electrical responsive clutches CL5 and CL6 (FIG. 8) and a pair of idler gears 184 and 185 spaced on either side of the respective clutches, for selectively engaging and disengaging the driving connection to a second drive shaft 186. The drive shaft 186 is journaled adjacent its opposite ends in the gear housing 71 and supports thereon a pair of oppositely disposed driven gears 187 and 188. The driven gear 187 is supported for engagement with one of the idler gears 184 for rotating the drive shaft 186 in one direction upon energization of clutch CL5. The other drive gear 188 is engageable with a spur gear 189 which is rotatably mounted on the housing 71 by means of a stub shaft 190 journaled therein, as best shown in FIG. 8. The spur gear 189 is engageable with the other idler gear 185 for rotating the drive shaft 186 in the opposite direction upon the energization of clutch CL6 and deenergization of clutch CL5. The output end of the drive shaft 186 is detachably connected to the input end of the drive shaft 175 by means of a flexible coupling 191.

In the form illustrated, a third reference potentiometer SP-3 may be mechanically coupled to the drive shaft 186 by means of a timer belt 192 trained over a drive pulley 193 mounted on the shaft, as best shown in FIG. 8 of the drawings. The timer belt 192 is also trained over a driven pulley 194 mounted on a rotatable limit switch LS5 which is fixedly secured to the gear housing 71. Moreover, rotational movement of the drive shaft 175 is mechanically directed to the reference potentiometer SP-3 and rotatable limit switch LS5 which function to control actuation of clutches CL5 and CL6 for rotating the stitcher heads 4 and 5 in a generally horizontal plane toward and away from the drum, as will hereinafter be more fully described with reference to the cycle of operation.

CONTROL STICK ASSEMBLY

Figure 16:
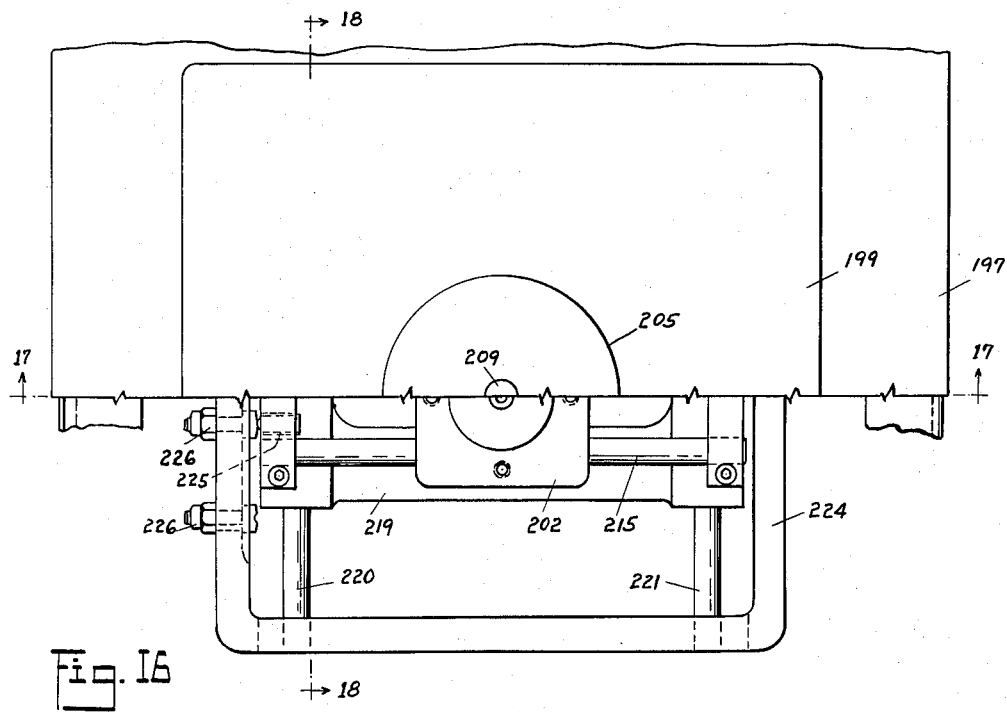
FIG. 16 is a fragmentary top plan view, showing the control stick assembly of the present invention with a portion of the slide and cover plate removed therefrom for purposes of clarity.
Figure 17:
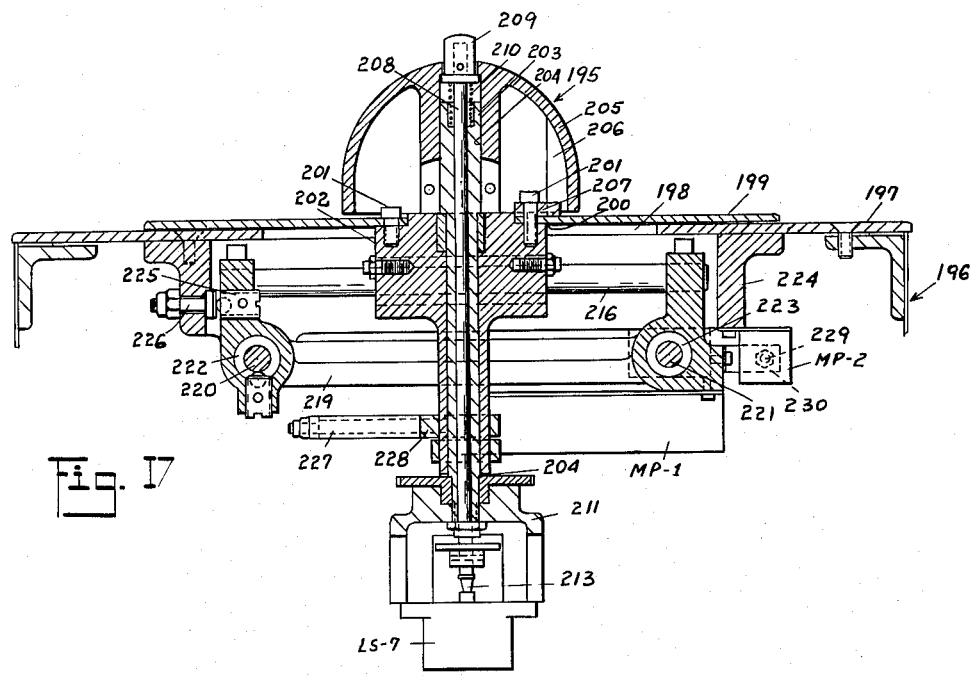
FIG. 17 is a cross sectional view taken along the plane of line 17—17 of FIG. 16.
Figure 18:
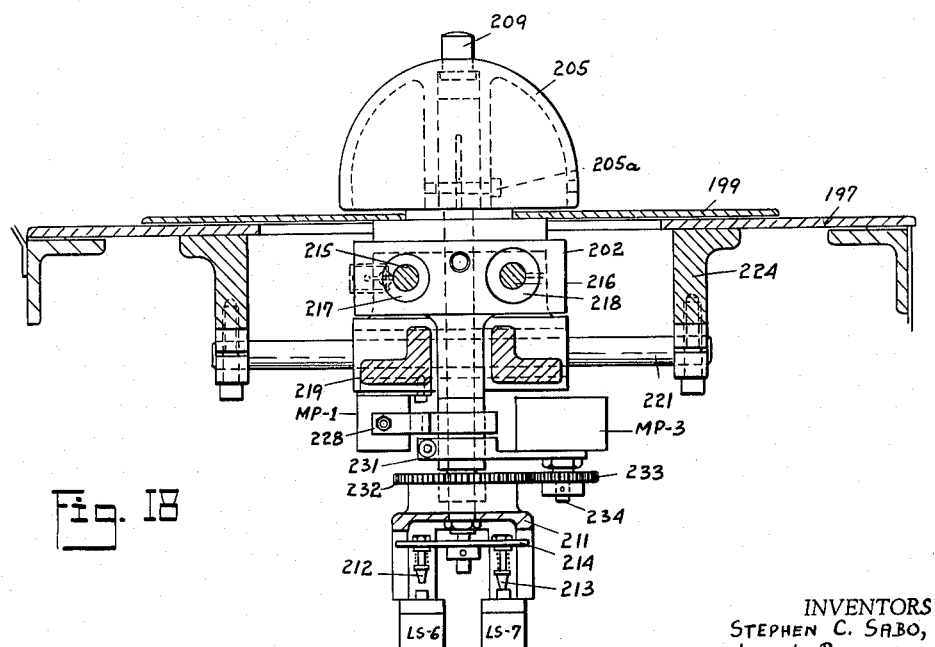
FIG. 18 is a cross sectional view taken along the plane of line 18—18 of FIG. 16.

Manual control of radial, axial, and rotational movements of the respective stitcher heads 4 and 5 may be accomplished by means of a control stick assembly, designated generally at 195, which may be mounted forwardly of the stitcher assembly on an operator's control console 196. As shown in FIGS. 16 to 18 of the drawings, the cover plate 197 of the console 196 is provided with an opening 198 which is bridged by a slide plate 199 supported for sliding engagement thereon. The slide plate 199 is provided with a central opening 200 (FIG. 17) and supports, by means of bolts 201, a generally T-shaped carriage 202 which depends downwardly therefrom. An elongated hollow sleeve 203 may be disposed for relative movement within a vertical bore 204 provided in the carriage 202 and arranged to project upwardly at one end beyond the plane of the slide plate 199. A control knob 205 may be fixedly secured to the projecting end of the sleeve 203 by means of a suitable cotter 205a. The control knob 205 is provided with an interior flange portion 206 (FIG. 17) that is adapted for engagement with a stop plate 207 secured to the carriage 202, thereby providing an abutment for limiting rotational movement of the knob.

An elongated push rod 208 may be disposed for vertical movement within the sleeve 203 and provided with a push button 209 fixedly secured adjacent its upper end thereof. In the form illustrated, a coil spring 210 (FIG. 17) is disposed around the push rod 208 bearing at one end against the push button 209 and bearing its other end against the sleeve 203 to provide a resilient coaction of the push rod 208 within the sleeve. A limit switch bracket 211 may be fixedly secured adjacent the lower end of the carriage 202 which serves to house a pair of resilient switch actuators 212 and 213 that depend from a bracket plate 214 affixed to the end of the push rod 208. The depending actuators 212 and 213 are vertically engageable with a pair of limit switches LS6 and LS7 that extend from the limit switch bracket 211. Depression of the push button 209, therefore, functions to actuate the respective limit switches LS6 and LS7 for removing automatic pressure loading from the respective stitcher heads 4 and 5, as will hereinafter be more fully described.

The carriage 202 is supported for transverse movement in one direction on a pair of parallel guide rods 215 and 216, which extend axially through cylindrical bushings 217 and 218 provided in the carriage 202, and which are fixedly secured at their opposite ends into a second movable carriage 219. The last mentioned carriage 219 is supported for transverse movement in a direction generally perpendicular to movement of the first mentioned carriage 202 by means of a second pair of parallel guide rods 220 and 221 which extend through cylindrical bushings 222 and 223, provided in the carriage 219, and which are fixedly secured at their opposite ends into the console support frame 224. The carriage 219 may be provided with a series of spaced ball plungers 225 (FIG. 17) adapted for sliding friction engagement with corresponding adjustable detents 226 projecting from the console support frame 224, which engageably function to facilitate relative movement and positioning between the respective carriages 202 and 219. By such a double carriage arangement, the operator is enabled to quickly and easily move the control knob 205 from side to side, backwardly and forwardly or in any angular direction, thereby manually controlling radial and/or axial movement of the respective stitcher heads 4 and 5.

Automatic control for radial movement of the stitcher heads 4 and 5, upon manual actuation of the control stick assembly 195, may be accomplished by means of a master potentiometer MP1, which is preferably of a rectilinear motion type. The master potentiometer MP1 may be secured at one end to the carriage 219, and is provided at its other end with a movable actuator 227 (FIG. 17) operably connected to the carriage 202 by means of a clamp arm 228.

In utilizing the control stick assembly 195, the operator may stand in front of the control console 196 looking in the general direction of the respective stitcher heads 4 and 5. Movement of the control knob 205 toward the operator, therefore, functions to direct a corresponding rectilinear motion to the actuator 227 which induces an output signal in the master potentiometer MP1. The output signal from the master results in a voltage unbalance between the master and the reference potentiometer SP1 (FIG. 4) which energizes clutch CL1 for moving the stitcher heads 4 and 5 radially inwardly toward the drum. Radial movement of the stitcher heads continues until a balanced or null voltage condition is achieved between the master MP1 and the reference potentiometer SP1. Continued movement of the control knob 205 toward the operator again results in a corresponding voltage unbalance between the potentiometers which energizes clutch CL1 for driving the stitcher heads radially inwardly. The extent of radial inward movement is controlled by limit switch LS8 mounted on the base 8 (FIG. 2). Conversely, movement of the control knob 205 backwardly away from the operator functions to direct a corresponding rectilinear motion to the actuator 227 in the opposite direction, thereby driving the master MP1 in the opposite direction. The output signal from the master MP1 induces a voltage unbalance between the former and the reference potentiometer SP1 in the opposite direction, which deenergizes clutch CL1 and energizes clutch CL2 (FIG. 4) for moving the stitcher heads radially away from the drum, until a balanced o rnull voltage is again achieved, as aforesaid. Should an extreme back position be reached before the balanced condition is achieved, the other limit switch LS9 mounted on the base 8 (FIG. 2) will be tripped to deenergize clutch CL2, thereby precluding further radial movement of the stitcher heads away from the drum.

Similarly, automatic control of the axial movement of the stitcher heads 4 and 5 toward and away from each other is accomplished by means of a second master potentiometer MP2, of the aforementioned rectilinear motion type, which is secured at one end (FIG. 17) to the control console support frame 224. Here, the movable actuator 229 of the master potentiometer MP2 is secured to the carriage 219 by means of a clamp 230. Moreover, as the operator moves the control knob 205 to his left, a corresponding rectilinear movement is imparted to the actuator 229, which produces an output signal in the master potentiometer MP2. The output signal results in a voltage unbalance between the master and the reference potentiometer SP2 (FIG. 8) which energizes clutch CL3 (FIG. 2) for moving the stitcher heads 4 and 5 axially toward the center of the drum, until a balanced or null voltage is again achieved, as aforesaid. Should the center position be reached before the balanced condition is achieved, a limit switch LS10 mounted on the radial carriage 3 (FIG. 2) will be tripped to deenergize clutch CL3, thereby precluding further axial movement of the stitcher heads. Accordingly, as the operator moves the control knob 205 to his right, a corresponding rectilinear movement is imparted to the actuator 229 for driving the master potentiometer MP2 in the opposite direction which deenergizes clutch CL3 and energizes clutch CL4 (FIG. 8) for moving the stitcher heads axially apart toward the ends of the drum. Should an extreme outward position be achieved before the balanced condition is reached, another limit switch LS11 (FIG. 2) mounted on the radial carriage 3 will be tripped to deenergize the clutch CL4 to preclude further axial outward movement thereof.

Rotational movement of the stitcher heads 4 and 5 in a generally horizontal plane toward and away from the drum may be accomplished by means of a third master potentiometer MP3 (FIG. 18) which is preferably of a rotatable motion type. The master potentiometer MP3 is secured to the carriage 202 by means of a support bracket 231. A drive gear 232 is fixedly secured to the sleeve 203 and is operable meshed with a driven gear 233 secured to the input shaft 234 of the master potentiometer MP3. Moreover, with the stitcher heads 4 and 5 axially aligned opposite the center of the drum, the operator's turning of the control knob 205 in a clockwise direction will impart a corresponding rotational movement to the input shaft 234 which induces an output signal in the master potentiometer MP3. The output signal from the master results in a voltage unbalance between the latter and the reference potentiometer SP3 (FIG. 8) which energizes clutch CL5 (FIG. 2) for simultaneously rotating the stitcher heads 4 and 5 in clockwise and counter-clockwise directions, respectively, toward the drum and until a predetermined balanced or null voltage condition is again achieved. In some cases, it may be desirable to rotate the stitcher heads to about 180° from the zero or horizontal position, such as for example, during the ply turn-up or turn-down operations or when breaking the fabric plies away from the drum. In such cases, the aforementioned rotatable limit switch LS5 mounted on the gear housing 71 (FIG. 8) will be tripped to deenergize clutch CL5, thereby precluding further rotation movement of the respective stitcher heads beyond 180°. Accordingly, the operator's turning the control knob 205 in a counterclockwise direction will drive the master MP3 in the opposite direction, thereby resulting in an opposite voltage unbalance between the potentiometers, such as to automatically rotate the stitcher heads in directions opposite to those as aforementioned.

CONTROL SYSTEM AND CYCLE OF OPERATION

Figure 19:
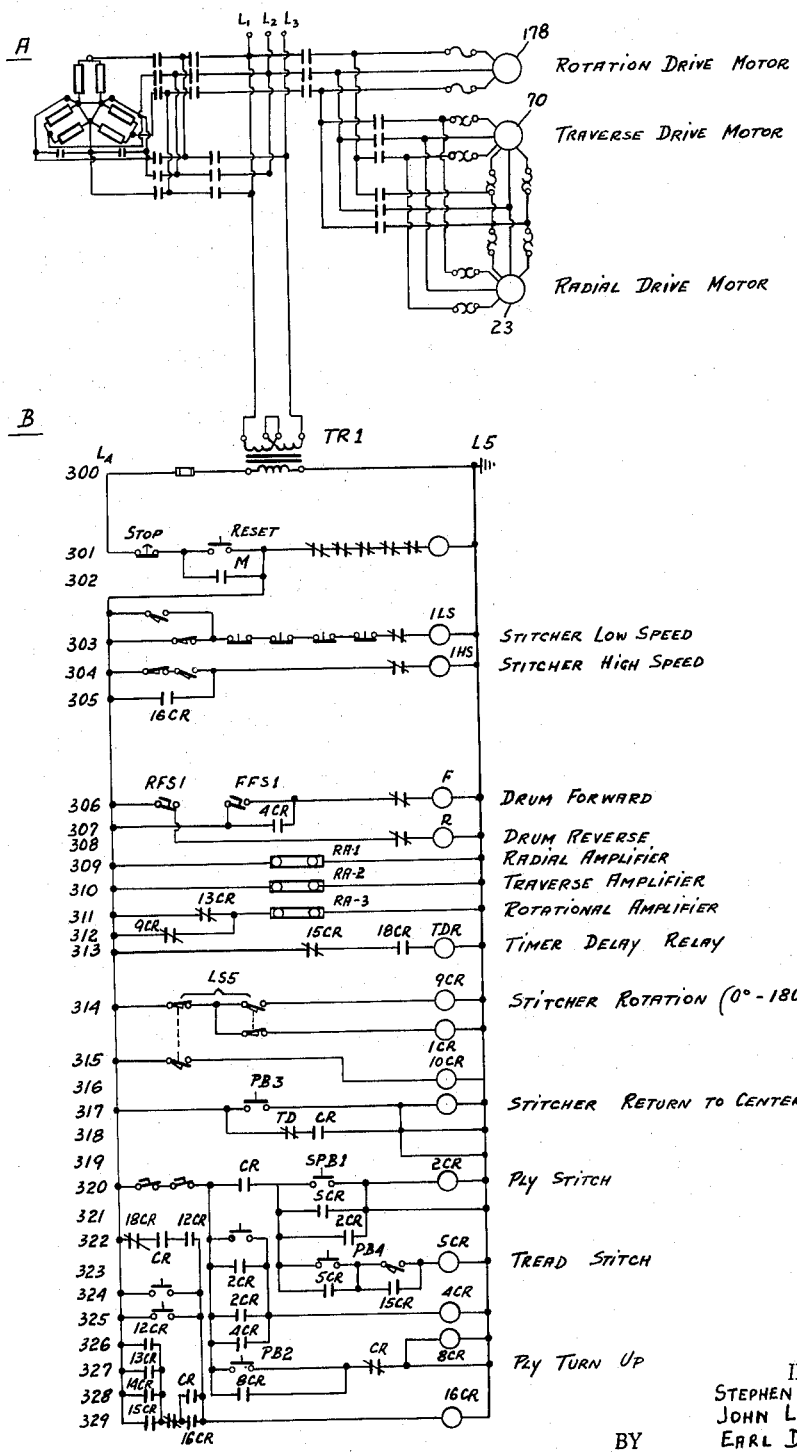

Referring now more particularly to FIGS. 19–21 of the drawings, there is illustrated a preferred schematic electrical control system for operation of the stitcher assembly. Certain of the operations performed by the stitcher assembly are controlled automatically by movements of the assembly parts, others by actuation of various push buttons, and/or foot switches, and others by manual operation of the aforementioned control stick assembly 195.

In the form illustrated, the electrical system includes a three-wire L1, L2, L3, 400 volt power circuit A and a two-wire L4, L5, 110 volt control circuit B, which derives its electrical energy from the circuit A by means of a transformer TR1. Further control is obtained from a two-wire L6, L7, 24 volt amplifier circuit C, which derives its electrical energy from a two-wire L8, L9, 6 volt control circuit D by means of a second transformer TR2. The electrical lines in FIGS. 19–21 have been consecutively numbered to the left of the drawings to facilitate location of the various components, whereas, the function of the components, in the respective lines, have been indicated to the right of the drawings. In the form hereinafter illustrated, the electrical components and/or function thereof and those not specifically referred to or designated herein are those customarily utilized and well known in the electrical art.

Preparatory to initiating the cycle of operation, the operator has applied the desired number of fabric plies F to the drum from a ply servicer (not shown). Upon initial operation, the radial carriage 3 (mounting the respective stitcher heads 4 and 5) is in its extreme rearward position opposite the center of the drum.

The operator commences the ply stitch operation by depressing the start button SPB1 (line 320) which energizes control relay 4CR (line 325) and the 4CR contact (line 326), thereby rotating the drum at a relatively low speed toward the operator. Control relay 2CR (line 320) and its 2CR contact (line 322) are energized for closing the normally open 2CR contact (line 350), which results in a voltage unbalance that is transmitted to the radial amplifier RA1 (line 309) for energizing motor 23 (FIG. 2) and clutch CL1 (line 330, FIG. 3). Energization of clutch CL1 causes the radial carriage 3 to move radially inwardly toward the drum. Radial inward movement continues until the stitcher heads 4 and 5 engage the drum, whereupon the adjustable screw 151 carried by the stitcher head 4 (FIG. 11) is caused to "ride-off" its contact plate 137, thereby establishing a circuit through the low pressure loading limit switches LS1 and LS2 (FIG. 12). Actuation of limit switches LS1 and LS2 energizes control relay 18CR (line 333) and deenergizes clutch CL1 for terminating further radial inward movement of the stitcher heads, thereby indicating that the stitcher wheels 90 and 91 have been loaded with a predetermined radial compacting pressure against the fabric plies F.

Energization of control relay 18CR (line 333) closes the normally open 18CR contact (line 355) thereby inducing a voltage unbalance in potentiometer P3 (line 356) which is transmitted to the transverse amplifier TA2 (line 310) for energizing clutch CL4 (line 341, FIG. 2). Energization of clutch CL4 causes the stitcher heads to spread axially apart, thereby effectively stitching the fabric plies F against the drum. The stitch-out continues until a balanced or null voltage condition is achieved on the potentiometer P3. By proper adjustment of the potentiometer P3, the operator is enabled to predetermine the traverse or axial spread of the stitcher heads within a range of between about 13 inches to 60 inches dependent on the desired tire size.

Upon attainment of the predetermined null voltage condition, clutch CL4 (FIG. 8) and control relay 15CR (line 342) are deenergized, thereby terminating the stitch-out operation. Deenergization of control relay 15CR energizes timer delay relay TDR (line 313) whose normally open TD contact (line 318) opens (after a predetermined time relay) to deenergize the 2CR and 18CR control relays and associated contacts, thereby completing the ply stitch cycle of operation and establishing the circuit through the control stick assembly 195 (FIGS. 16–18) for manual operation.

Upon completion of the stitch-out operation, the operator will commence the ply turn-down by manually pulling the marginal edges of the fabric plies F down around the shoulders of the drum. The operator will then stitch the fabric plies F in place by turning the control knob 205 of the control stick assembly 195 so as to simultaneously rotate the stitcher heads 4 and 5 in clockwise and counterclockwise directions, respectively, around the shoulders of the drum. By simple observation of one of the stitcher heads, such as for example the stitcher head 4, the operator may effectively cause the turn-up wheels 92 and 93 to synchronously and simultaneously stitch around the shoulders of the drum in the manner of a profiling operation, utilizing the drum 2 as a templet. By controlling the relative angular movement of the stitcher heads, the operator may maintain the desired pressure loading on the wheels 92 and 93 to achieve a positive and uniform compacting of the fabric plies F.

Upon completion of the ply stitch-down operation, the bead rings R (FIG. 9) may be positioned over the fabric plies by means of a conventional bead setter (not shown). The operator will then commence the ply turn-up operation by manually pulling the marginal edges of the fabric plies F up around the bead rings R. The stitcher heads 4 and 5 are again positioned adjacent the ends of the drum and rotated between about 135° to 180° around the shoulders of the drum by manual actuation of the control knob 205. The operator then removes the manual control from the circuit by depressing the ply turn-up push button PB2 (line 327) which energizes control relay 8CR (line 326) and 8CR contact (line 328) which re-establishes the automatic control circuit for low pressure loading.

Energization of control relay 8CR induces a voltage unbalance which is transmitted through the radial amplifier RA1 (line 309) and the traverse amplifier TA2 (line 310) for energizing clutches CL2 and CL3 (lines 337 and 334), respectively. Energization of clutches CL2 and CL3 causes the stitcher heads to move radially away from the drum while simultaneously moving axially inwardly toward one another for synchronously stitching the marginal edges of the fabric plies F up around the bead rings R. The stitcher heads continue to move radially away from the drum with the radial and axial low pressure loading on the wheels 92 and 93 controlled by the low pressure limit switches LS1 and LS2 (FIG. 12) mounted on the stitcher head 4, as aforesaid. Excessive axial loading, for example, causes the stitcher arms 97 and 98 to "ride-off" their contact plates 137 and 138, thereby actuating limit switches LS1 and LS2. Actuation of limit switches LS1 and LS2 produces a voltage unbalance which is transmitted through the traverse amplifier TA1 for again energizing clutch CL4. Energization of clutch CL4 causes the stitcher heads 4 and 5 to spread axially apart, thereby automatically relieving the pressure loading of the wheels 92 and 93 relative to the drum. By such an arrangement, movement of the respective stitcher heads 4 and 5 is automatically and simultaneously coordinated to maintain the desired pressure compacting of fabric plies.

The stitcher heads 4 and 5 continue to move radially away from the drum, in the manner aforementioned, until a predetermined balanced condition on the potentiometer P6 (line 349) is reached, thereby deenergizing clutch CL2 and terminating further radial movement thereof. The stitcher heads then commence to rotate up around the shoulders of the drum, until a predetermined balanced voltage condition on the potentiometer P8 (line 362) is reached. The potentiometer P8 is preferably pre-set, such that the stitcher heads are enabled to rotate back from the 135° to 180° ply turn-up position to within about 45° of the normal or horizontal zero degree position of the stitcher heads. As the stitcher heads rotate through the 45° position toward the horizontal zero degree position, clutch CL1 is energized and clutch CL2 is deenergized by actuation of the low pressure limit switch LS1 and LS2, which causes the stitcher heads 4 and 5 to move radially inward toward the drum, thereby automatically maintaining a predetermined pressure loading on wheels 92 and 93 as they continue to profile around the shoulders of the drum, as aforesaid. Accordingly, to make a double bead tire, for example, the ply stitch, stitch-down and ply turn-up operations would again be repeated in the manner, as aforementioned.

After the desired number of fabric plies have been applied to the drum, the operator will then return the radial carriage 3, mounting the respective stitcher heads 4 and 5, to the start position opposite the center of the drum by depressing the re-set push button PB3 (line 317) which energizes control relay CR (line 317) and its CR contact (line 318). Energization of control relay CR closes the normally open CR contact (line 328) which energizes control relay 16CR (line 329). Normally open 16CR contact then closes for energizing the normally closed 1HS contact (line 304), which establishes a high speed circuit for returning the stitcher heads at a relatively high speed to the start position. The normally open CR contact (line 350) then closes, which again induces a voltage unbalance that is transmitted through the radial and traverse amplifiers RA1 and TA2 for energizing clutches CL2 and CL3, respectively. Upon energization of clutches CL2 and CL3, the stitcher heads 4 and 5 are automatically returned to the start position to commence the tread stitch cycle of operation.

On applying the tire tread T to the drum, from a tread servicer (not shown), the operator commences the tread stitch operation by depressing the tread stitch push button PB4 (line 323) which energizes control relay 5CR (line 323) and its CR contact (line 324). Actuation of PB4 again energizes control relay 2CR (line 320) and its 2CR contact (line 322), thus closing the normally open 2CR contact (line 350) which induces a voltage unbalance in the radial amplifier RA1 (line 322) for energizing clutch CL1, thereby moving the radial carriage 3 radially inwardly toward the drum. Upon engagement of the stitcher heads 4 and 5 with the drum, the high pressure limit switches LS3 and LS4 (lines 335 and 336) mounted on the stitcher head 5 (FIG. 15) are actuated, thereby indicating that the stitcher heads have been loaded with a predetermined radial pressure against the drum. Actuation of limit switches LS3 and LS4 energizes control relay 18CR (line 333) and its 18CR contact (line 355), thereby deenergizing clutch CL1 and energizing clutch CL4 for moving the stitcher head axially apart towards the ends of the drum. In this form, the stitcher wheels 90 and 91 of the respective stitcher heads 4 and 5 are caused to stitch out along the tread until a balanced condition is reached on the potentiometer P4 (line 358), whereupon, control relay 5CR (line 323) and clutch CL4 are deenergized, thereby completing the tread stitch operation.

When the balanced condition on the potentiometer P4 is achieved, control relay 15CR (line 342) is again deenergized to prevent further axial movement of the stitcher heads. Deenergization of 15CR again energizes timer delay relay TDR (line 313) whose TR contact (line 318) opens (after a predetermined time delay) to deenergize control relays CR (line 317) and 2CR (line 320) thereby completing the tire building operation and re-establishing the circuit through the control stick assembly 195 for manual operation.

Deenergization of control relay 5CR removes the high pressure loading maintained by limit switches LS3 and LS4 from the circuit and re-establishes the circuit through the low pressure limit switches LS1 and LS2. Such application is desirable, for example, when performing the side-wall stitch and for subsequently stitching the remainder of the fabric plies by means of a low pressure compaction. Moreover, as the stitcher heads 4 and 5 engage the drum the low pressure limit switches LS1 and LS2 are selectively actuated in response to such movement, thereby maintaining a predetermined radial and/or axial loading pressure on the stitcher wheels 90, 91 during such auxiliary compacting operations.

Removal of the completed ply band from the drum may be accomplished in part through manual actuation of the control stick assembly 195. The operator first moves the control knob 205 to his right, thereby simultaneously and synchronously moving the stitcher heads 4 and 5 axially apart towards the ends of the drum. The push button 209 (FIGS. 16–18) located in the center of the control knob 205, is then depressed to actuate limit switches LS6 and LS7 (FIGS. 17 and 18), which in turn deenergizes the low pressure limit switches LS1 and LS2, thereby removing the automatic low pressure loading from the circuit. The stitcher heads 4 and 5 may then be rotated about 180° in clockwise and counterclockwise directions, respectively, by manual turning of the control knob 205 until the marginal edges of the turn-up wheels 92 and 93 are inserted between the plyband and the drum. The operator then commences to move the control knob 205 outwardly away from himself, thereby energizing clutch CL2 and causing the stitcher heads to move radially away from the drum. Radial outward movement is continued until the wheels 92 and 93 effectively break the adhesive bonding of the ply bands away from the drum. The operator then depresses the reverse foot switch RFS1 (line 306) which deenergizes control relay 4CR (line 325) and its 4CR contact (line 307), thereby terminating rotational movement of the drum, whereupon, the drum may then be collapsed and the ply band removed therefrom in the customary manner for subsequent vulcanization. Thereafter, the operator may return the respective stitcher heads 4 and 5 to the start position, as aforesaid, so that the stitcher assembly is again in position to begin another cycle of operation.

From the foregoing description and accompanying drawings, it will be seen that the present invention provides a novel stitcher assembly for building tire bands of various sizes of tires, especially of heavy duty types, such as for trucks, buses, airplanes and the like. It will be seen that the invention provides a novel ply and tread stitch assembly having three axes of movement to provide articulated movement in radial, axial, rotational or through any combination of such movements for uniformly compacting tire-band stock on a tire building drum. The stitcher assembly of the present invention incorporates a pair of stitcher heads, each having a novel set of stitcher and turn-up pressure applying wheels mounted thereon, which may be automatically controlled for precisely compacting and turning the marginal edges of the tire band stock around inextensible bead rings incorporated therewith. By such combined ply and tread stitcher assembly, there is provided a more simplified and economic construction with consequent savings in floor space and machine weight as compared to conventional devices which incorporate separate ply and tread stitch mechanisms.

The present invention incorporates a novel force applying media, in the form of resilient torsion springs, associated with the respective stitcher wheels which functionally coact therewith to yieldably maintain the wheels with a predetermined uniform pressure compacting against the tire band stock. Such an arrangement is not only highly efficient and economical to produce, but provides a multiplicity of compacting pressures by mere mechanical adjustment, as compared to the far more complicated and expensive hydraulic devices heretofore utilized. Furthermore, such prior hydraulic devices have the pronounced disadvantage of bouncing or leaving the tire band stock during the stitching operations and consequently entrapping air between the fabric plies. The damping characteristics of the force applying media of the present invention, maintains the stitcher wheels in uniform pressure compacting engagement against the drum, thereby eliminating such heretofore existing problems.

The present invention provides a novel stitcher assembly which may be controlled automatically by movements of the various component parts, by actuation of various push buttons and/or foot switches and by selective manual operation of a novel control stick mechanism associated therewith. Moreover, by such an arrangement the stitcher assembly of the present invention may be quickly and easily implemented by semi-automatic control through simple manipulation of a novel manual control stick for independently and selectively moving the stitcher and turn-up wheels linearly or in any angular direction relative to the tire building drum. Accordingly, the operator is enabled by mere observation and simple manipulative steps to perform the delicate stitch-down and stitch-up operation with a maximum of precision, but with a minimum of effort. In addition, by such semi-automatic control, the operator by simple manual manipulative operation may quickly and easily remove the completed tire band from the drum by actuation of the turn-up wheels, thereby eliminating the heretofore existing requirement of complicated and expensive mechanical and/or hand tools utilized for breaking the adhesive bonding of the tire band from the tire building drum.

The terms and expressions which have been used are used as terms of description and not of limitation, and there is no intention in the use of such terms and expressions of excluding any equivalents of any of the features shown or described, or portions thereof, but it is recognized that various modifications are possible within the scope of the invention claimed.

We claim:
1. An apparatus for compacting fabric plies on a rotatable tire building drum comprising, a frame, a support carriage mounted on said frame for radial movement toward and away from said drum, a traverse carriage mounted on said support carriage for axial movement with respect to the rotational axis of said drum, a stitcher head rotatably mounted on said traverse carriage for rotation about a vertical axis, a support arm mounted on said stitcher head for pivotal movement about a horizontal axis, pressure applying wheel means rotatably mounted adjacent one end of said support arm for compacting engagement with the fabric plies on said drum, a hollow hub attached adjacent the other end of said support arm, a polygonal shaft disposed through said hub and journaled at its opposed ends to said head, and elastomeric torsion spring means disposed for coacting engagement between said hub and said shaft for maintaining the predetermined yieldable compacting engagement of said wheel means on said fabric plies during rotation of said drum.

2. An apparatus in accordance with claim 1, including an adjustable stop means operably coacting between said shaft and said stitcher head, whereby said shaft may be selectively rotated about its longitudinal axis and locked against further rotational movement with respect to said hub for imparting a predetermined torsional compression on said elastomeric spring means.

3. An apparatus in accordance with claim 1, wherein said wheel means includes a pair of laterally spaced, annular stitcher wheels mounted on opposite sides of said support arm for rotation about a common horizontal axis, one of said wheels having a generally arcuate peripheral edge surface for turning the fabric plies around the shoulder portions of said drum, the other of said wheels having a generally planar peripheral edge surface for compacting the plies against said drum, said last mentioned wheel having a greater diameter as compared to the diameter of the other of said wheels, whereby each of said wheels may be moved independently into compacting engagement with the fabric plies on said drum.

4. An apparatus for compacting fabric plies on a rotatable tire building drum comprising, a frame disposed below said drum, a support carriage mounted on said frame for radial movement toward and away from said drum, a traverse carriage mounted on said support carriage, drive means for moving said traverse carriage on said support carriage axially and generally parallel to the rotational axis of said drum, a stitcher head mounted on said traverse carriage, drive means for rotating said stitcher head angularly about a vertical axis, a support arm mounted on said stitcher head for pivotal movement about a horizontal axis, stitcher wheel means rotatably mounted adjacent one end of said support arm for compacting engagement with the fabric plies on said drum, a hollow, polygonal hub fixedly attached adjacent the other end of said support arm, a polygonal shaft disposed through said hub and journaled at its opposed ends on said head, a plurality of elastomeric torsion spring elements disposed in the space between said shaft and said hub for maintaining a predetermined yieldable compacting engagement of said wheel means against said fabric plies during rotation of said drum.

5. An apparatus for compacting fabric plies on a rotatable tire building drum comprising, a frame disposed below said drum, a support carriage mounted on said frame, drive means for moving said support carriage on said frame radially toward and away from said drum, a pair of traverse carriages mounted on said support carriage, drive means for moving said traverse carriages on said support carriage axially toward and away from one another and generally parallel with respect to the rotational axis of said drum, a stitcher assembly mounted on each of said traverse carriages, each of said assemblies including a head mounted on one of the respective traverse carriages, drive means for synchronously rotating said heads about a vertical axis, a support arm mounted on each of said heads for pivotal movement about a horizontal axis, a pair of spaced, oppositely disposed stitcher wheels rotatably mounted adjacent one end of each of said support arms, a hollow, polygonal hub integrally attached adjacent the other end of each of said support arms, a polygonal shaft disposed horizontally through each of said hubs and journaled at its opposed ends on said head, a plurality of elastomeric rope-like strands disposed in the clearance areas presented between the respective of said hubs and shafts for maintaining a predetermined yieldable compacting engagement of said stitcher wheels against the fabric plies upon pivotal movement of said support arms, and adjustable stop means coacting between the respective of said shafts and heads for the maintenance of a predetermined torsional compression on said strands.

6. A stitcher mechanism for compacting fabric plies on a rotatable tire building drum mounted on a frame disposed below said drum, said mechanism comprising a carriage mounted on said frame including means for moving said carriage radially toward and away from said drum and means for moving said carriage axially and generally parallel with respect to the rotational axis of said drum, a support arm mounted on said carriage for pivotal movement about a horizontal axis, at least one stitcher wheel rotatably mounted adjacent one end of said arm, a hollow, polygonal hub integrally attached adjacent the other end of said arm, a polygonal shaft extending through said hub and journaled at its opposed ends on said carriage, said shaft being rotatable about a longitudinal axis relative to said hub so as to provide a plurality of clearance areas therebetween, and an elastomeric rope-like strand disposed in each of the respective clearance areas adapted to be deformed upon pivotal movement of said arm for maintaining a yieldable compacting engagement of said stitcher wheel against said fabric plies, and selectively adjustable means coacting between said shaft and said carriage for locking said shaft in any desired rotational position relative to said hub, thereby to maintain a predetermined torque loading pressure on said strands.

7. An apparatus for compacting fabric plies on a rotatable tire building drum comprising, a frame disposed below said drum, a support carriage mounted on said frame, first drive means for moving said support carriage on said frame radially toward and away from said drum, motor means for driving said first drive means, a pair of electro-magnetic, radial clutch means in circuit with said motor means and operably connected to said first drive means, one of said radial clutch means being operative upon energization to move said support carriage radially toward said drum upon de-energization of said other radial clutch means, and said other radial clutch means being operative upon energization to move said support carriage radially away from said drum upon de-energization of said first mentioned radial clutch means, a pair of traverse carriages mounted on said support carriage, second drive means for moving said traverse carriages axially toward and away from one another and parallel with respect to the rotational axis of said drum, motor means for driving said second drive means, a pair of electro-magnetic, axial clutch means in circuit with said motor means and operably connected to said second drive means, one of said axial clutch means being operative upon energization to move said traverse carriages axially away from one another upon de-energization of said other axial clutch means, and said other axial clutch means being operative upon energization to move said traverse carriages axially toward one another upon de-energization of said first mentioned axial clutch means, a support arm mounted on each of said traverse carriages for pivotal movement about a horizontal axis, each of said arms having at least one stitcher wheel rotatably mounted adjacent one end thereof for compacting engagement with the fabric plies on said drum, third drive means for rotating said arms about a vertical axis, motor means for driving said third drive means, a pair of electro-magnetic, rotational clutch means in circuit with said motor means and operably connected to said third drive means for synchronously controlling rotational movement of said arms about their vertical axes.

8. An apparatus in accordance with claim 7, including low pressure limit switch means connected in the circuit with said radial and axial clutch means, low pressure contact means pivotally mounted on one of said traverse carriages operative to alternately actuate said low pressure limit switch means in response to pivotal movement of an associated one of said arms to maintain a predetermined low pressure loading engagement of said stitcher wheels with respect to the fabric plies on said drum, high pressure limit switch means connected in the circuit with said radial and axial clutch means, and high pressure contact means pivotally mounted on the other of said traverse carriages operative to alternately actuate said high pressure limit switch means in response to pivotal movement of the other of said arms to maintain a predetermined high pressure loading engagement of said stitcher wheels with respect to the fabric plies on said drum.

9. In the combination, a stitcher mechanism for compacting fabric plies on a rotatable tire building drum and a manually operable control assembly for automatically controlling radial, axial and rotational movement of said mechanism comprising, a frame, a support carriage means mounted on said frame for radial movement toward and away from said drum, a pair of traverse carriage means mounted on said support carriage means for axial movement toward and away from one another and parallel with respect to the rotational axis of said drum, a support arm means mounted on each of said traverse carriage means for pivotal movement about a horizontal axis, each of said support arms means having at least one stitcher wheel mounted adjacent one end thereof for compacting engagement with the fabric plies on said drum, drive means for moving each of the respective carriage means and for synchronously rotating said support arm means, electro-magnetic clutch means operably connected to each of the respective drive means, reference potentiometer means in circuit with each of the respective clutch means and operably connected to each of the respective drive means, said control assembly including a manually operable control means disposed adjacent said mechanism, master potentiometer means operably connected to said control means and connected in the circuit of each of the respective reference potentiometer means for actuating the associated one of said clutch means, whereby any radial, axial and rotational movement of said control means is operative to automatically move the respective carriage means and support arm means in the same corresponding direction, thereby to selectively move said stitcher wheels in any linear or angular direction relative to the rotational axis of said drum.

10. A mechanism for compacting tire band stock on a tire building drum comprising, a frame, a support carriage mounted on said frame, drive means for moving said support carriage radially toward and away from said drum, control means for governing movement of said drive means, a pair of traverse carriages mounted on said support carriage, drive means for moving said traverse carriages axially toward and away from one another and parallel with respect to the rotational axis of said drum, control means for governing said second mentioned drive means, a stitcher head mounted on each of said traverse carriages, drive means for synchronously rotating said stitcher heads at various angles about a vertical axis, control means for governing said third mentioned drive means, a support arm pivotally mounted on each of said stitcher heads for rotation about a horizontal axis, each of said support arms mounting a pair of stitcher wheels for pivotal engagement with the tire band stock on said drum, elastomeric torsion spring means operably coacting with said support arms for maintaining a yieldable compacting pressure of said wheels on said tire band stock, control means responsive to pivotal movement of said support arms for maintaining said wheels in predetermined pressure compacting engagement with said tire band stock, and linkage means operably connected to said support carriage and to each of said traverse carriages, said linkage means being adapted for juxtaposed alignment over said first mentioned drive means, thereby to provide a protective shield for said drive means during radial movement of said support carriage with respect to said drum.

References Cited by the Examiner

UNITED STATES PATENTS

| | | | |
|---|---|---|---|
| 1,613,519 | 1/1927 | MacBeth | 156—411 |
| 1,970,780 | 8/1934 | Stevens | 156—408 X |
| 2,262,259 | 11/1941 | Shook | 156—409 |
| 2,681,684 | 6/1954 | Gilletta et al. | 156—410 X |
| 2,936,023 | 5/1960 | Gilletta et al. | 156—410 |
| 3,051,220 | 8/1962 | Ewing et al. | 156—135 X |

FOREIGN PATENTS

| | | |
|---|---|---|
| 658,008 | 10/1951 | Great Britain. |
| 669,934 | 4/1952 | Great Britain. |

EARL M. BERGERT, *Primary Examiner.*

C. B. COSBY, *Assistant Examiner.*